US006482387B1

United States Patent
Gülgün et al.

(12) 
(10) Patent No.: US 6,482,387 B1
(45) Date of Patent: Nov. 19, 2002

(54) PROCESSES FOR PREPARING MIXED METAL OXIDE POWDERS

(75) Inventors: Mehmet Ali Gülgün, Stuttgart (DE); Waltraud M. Kriven, 915 W. Church St., Champaign, IL (US) 61821; My Hoang Nguyen, San Jose, CA (US)

(73) Assignee: Waltraud M. Kriven, Champaign, IL (US)

( * ) Notice: Subject to any disclaimer, the term of this patent is extended or adjusted under 35 U.S.C. 154(b) by 0 days.

(21) Appl. No.: 09/333,570

(22) Filed: Jun. 16, 1999

Related U.S. Application Data

(63) Continuation-in-part of application No. 08/841,995, filed on Apr. 22, 1997, now abandoned.
(60) Provisional application No. 60/015,906, filed on Apr. 22, 1996.

(51) Int. Cl.[7] .............. C01G 43/00; C01G 49/00; C01G 37/00; C01G 23/00; C01G 25/00
(52) U.S. Cl. .............. 423/593; 423/600; 423/594; 423/595; 423/596; 423/597; 423/598; 423/599; 423/263; 423/252; 423/253
(58) Field of Search .............. 423/593, 600, 423/594, 595, 596, 597, 598, 599, 263, 252, 253, 61, 115

(56) References Cited

U.S. PATENT DOCUMENTS

| | | | |
|---|---|---|---|
| 3,846,527 A | 11/1974 | Winter et al. | 423/263 |
| 4,812,426 A | 3/1989 | Takagi et al. | 423/598 |
| 5,228,910 A | 7/1993 | Joyce et al. | 106/450 |
| 5,330,697 A | 7/1994 | Wong | 264/171 |
| 5,698,483 A | 12/1997 | Ong et al. | 423/263 |
| 5,744,118 A | 4/1998 | Imamura et al. | 423/593 |
| 5,788,950 A | 8/1998 | Imamura et al. | 423/593 |

FOREIGN PATENT DOCUMENTS

JP 53-104898 9/1978

OTHER PUBLICATIONS

Heuer, A.H., et al., "Phrase Transformations in $ZrO^2$–Containing Ceramics: 1, The Instability of $c$–$ZrO^2$ and the Resulting Diffusion–Controlled Reactions," *Adv. in Ceramics—Science and Technology of Zirconia II* 12, 1–13 (1983), no month.

Gülgün, M.A. et al., "Preparation and Hydration Kinetics of Pure $CaAl_2O_4$", *Mat. Res. Soc. Symp. Proc.*, vol. 245, 199–204 (1992), no month.

Gülgün, Mehmet A., et al. "Chemical Synthesis and Characterization of Calcium Aluminate Powders," *J. Am. Ceram. Soc.* 77[2]531–539 (1994), no month.

Risovanyi, V.D., et al., "Hf and Dy2Ti05 based control elements for thermal water cooled reactors", *At. Energ.* 81(5), 333–40 (5/96).

*Primary Examiner*—Steven Bos
(74) *Attorney, Agent, or Firm*—Woodard, Emhardt, Naughton, Moriarty & McNett

(57) ABSTRACT

Described are preferred polymerized organic-inorganic processes for producing mixed metal oxide powders suitable for use in the ceramics and related industries. The preferred processes employ a non-chelating polymer such as polyvinyl alcohol or polyalkylene glycol as a carrier and can provide single-phase, mixed oxide powders in high yields at relatively low temperatures.

25 Claims, 18 Drawing Sheets

Flow chart of ethylene glycol method

Table IV. Powder Preparation and Processing Variables

| | Chemical Agents | pH adjustment | Solution Color | Burnout temp.(°C) | Properties of organic/inorganic precursor |
|---|---|---|---|---|---|
| $C_2S$ | Calcium-nitrate[¥] + Ludox SK | Nitric acid adj pH: 2 | Transparent | 3°C/min, 1hr hold at 700°C | White precursor fairly coarse texture hydrophilic |
| $C_3S$ | Calcium nitrate + Ludox SK | Nitric acid adj pH: 2 | Transparent | 3°C/min, 1hr hold at 700°C | White precursor coarse texture hydrophilic |
| $C_3A$ | Calcium nitrate + Aluminum nitrate[‡] | — | Transparent | 3°C/min 1hr hold at 700°C | Yellow precursor soft and porous texture hydrophilic |
| $C_4AF$ | Calcium nitrate + Aluminum nitrate + Iron nitrate[§] | — | Transparent | 3°C/min 1hr hold at 700°C | Red/brown precursor soft and porous texture hydrophilic |

[¥] $Ca(NO_3)_2 \cdot 4H_2O$ (reagent grade, Aldrich Chem. Co., Milwauke, WI)
[‡] $Al(NO_3)_2 \cdot 9H_2O$ (reagent grade, Aldrich Chem. Co., Milwaukee, WI)
[§] $Fe(NO_3)_3 \cdot 9H_2O$ (reagent grade, ALFA Aesor Chem. Co., Ward Hill, MA)

*Fig. 13*

Table VII Crystallization Behavior from High Degree of Polymerization PVA

| Temperature (°C) | C₂S (4:1) | C₃S (8:1) | C₃A (8:1) | C₄AF (8:1) |
|---|---|---|---|---|
| 600 | Amorphous | Amorphous | Amorphous | Amorphous |
| 700 | Amorphous+α'$_L$-Ca$_2$SiO$_4$ | Amorphous | Ca$_3$Al$_2$O$_6$<CaO | Ca$_4$Al$_2$Fe$_3$O$_{10}$ |
| 800 | α'$_L$-Ca$_2$SiO$_4$+CaO<β-Ca$_2$SiO$_4$ | β-Ca$_2$SiO$_4$+CaO+Ca$_3$SiO$_5$ | Ca$_3$Al$_2$O$_6$<CaO | Ca$_4$Al$_2$Fe$_3$O$_{10}$ |
| 900 | α'$_L$-Ca$_2$SiO$_4$+[CaO]<β-Ca$_2$SiO$_4$ | β-Ca$_2$SiO$_4$+CaO+Ca$_3$SiO$_5$ | Ca$_3$Al$_2$O$_6$>CaO | Ca$_4$Al$_2$Fe$_3$O$_{10}$ |
| 1000 | β-Ca$_2$SiO$_4$+[CaO] | Ca$_3$SiO$_5$+CaO | Ca$_3$Al$_2$O$_6$>CaO | Ca$_4$Al$_2$Fe$_3$O$_{10}$ |
| 1100 | β-Ca$_2$SiO$_4$+[CaO] | Ca$_3$SiO$_5$+CaO | Ca$_3$Al$_2$O$_6$+[CaO] | Ca$_4$Al$_2$Fe$_3$O$_{10}$ |
| 1200 | β-Ca$_2$SiO$_4$ | Ca$_3$SiO$_5$+CaO | Ca$_3$Al$_2$O$_6$+[CaO] | Ca$_4$Al$_2$Fe$_3$O$_{10}$ |
| 1300 | γ-Ca$_2$SiO$_4$ | Ca$_3$SiO$_5$+CaO | Ca$_3$Al$_2$O$_6$ | Ca$_4$Al$_2$Fe$_3$O$_{10}$ |
| 1400 | γ-Ca$_2$SiO$_4$ | Ca$_3$SiO$_5$+[CaO] | Ca$_3$Al$_2$O$_6$ | Ca$_4$Al$_2$Fe$_3$O$_{10}$ |

( ) : Optimum PVA content in terms of ratio of cation valences to (OH) functional groups, for lowest crystallization temperature.
[ ] : Much smaller amounts relative to other phases present.

*Fig. 14*

Table VIII. Crystallization Behavior from Low Degree of Polymerization PVA

| Temperature (°C) | C₂S (4:1) | C₃S (4:1) | C₃A (4:1) | C₄AF (4:1) |
|---|---|---|---|---|
| 600 | amorphous + α'ₗ-Ca₂SiO₄ | amorphous | amorphous | amorphous |
| 700 | α'ₗ-Ca₂SiO₄+CaO <β- Ca₂SiO₄ | Ca₃SiO₅+CaO | Ca₃Al₂O₆ < CaO | Ca₄Al₂Fe₃O₁₀ |
| 800 | α'ₗ-Ca₂SiO₄+[CaO] <β- Ca₂SiO₄ | Ca₃SiO₅+CaO | Ca₃Al₂O₆ > CaO | Ca₄Al₂Fe₃O₁₀ |
| 900 | β- Ca₂SiO₄+[CaO] | Ca₃SiO₅+CaO | Ca₃Al₂O₆> CaO | Ca₄Al₂Fe₃O₁₀ |
| 1000 | β- Ca₂SiO₄+[CaO] | Ca₃SiO₅+CaO | Ca₃Al₂O₆+[CaO] | Ca₄Al₂Fe₃O₁₀ |
| 1100 | β- Ca₂SiO₄ | Ca₃SiO₅+CaO | Ca₃Al₂O₆+[CaO] | Ca₄Al₂Fe₃O₁₀ |
| 1200 | γ- Ca₂SiO₄ | Ca₃SiO₅+CaO | Ca₃Al₂O₆ | Ca₄Al₂Fe₃O₁₀ |
| 1300 | γ- Ca₂SiO₄ | Ca₃SiO₅+CaO | Ca₃Al₂O₆ | Ca₄Al₂Fe₃O₁₀ |
| 1400 | γ- Ca₂SiO₄ | Ca₃SiO₅+[CaO] | Ca₃Al₂O₆ | Ca₄Al₂Fe₃O₁₀ |

( ): Optimum PVA content in terms of ratio of cation valences to -(OH) functional groups, for lowest crystallization temperature.
[ ]: much smaller amounts relative to other phases present.

*Fig. 15*

Table IX. BET Specific Surface Area of Each Crystallized Compound at Optimum PVA Content

| Powder | | $C_2S$ | $C_3S$ | $C_3A$ | $C_4AF$ |
|---|---|---|---|---|---|
| High degree of polymerization PVA | Crystallization temp. (°C) | 900 | 1400 | 1100 | 700 |
| | Holding time (h) | 1 | 2 | 3 | 1 |
| | BET S.S.A. (m²/g) | 12.9 | 0.9 | 2.3 | 9.1 |
| Low degree of polymerization PVA | Crystallization temp. (°C) | 800 | 1400 | 1000 | 700 |
| | Holding time (h) | 1 | 1 | 1 | 1 |
| | BET S.S.A. (m²/g) | 22.1 | 0.8 | 4.2 | 17.1 |
| | BET S.S.A. (m²/g) (after attrition milling for 1 h) | | 50[§] | 18.9[†] | |

[§] High DP PVA method
[†] Low DP PVA method

*Fig. 17*

PROCESSES FOR PREPARING MIXED METAL OXIDE POWDERS

REFERENCE TO RELATED APPLICATION

This application is a continuation-in-part of U.S. patent application Ser. No. 08/841,995 filed Apr. 22, 1997, now abandoned, and claims priority upon U.S. Provisional Application Ser. No. 60/015,906, filed Apr. 22, 1996, which are hereby incorporated by reference herein in their entirety.

BACKGROUND OF THE INVENTION

The present invention relates generally to processes for preparing mixed oxide powders such as those used in the ceramics industry, and in particular to polymerized organic-inorganic routes to such mixed oxide powders.

As further background, mixed oxide powders have been prepared in the past by a number of synthetic routes, including for example traditional high temperature solid-state routes using metal oxides or carbonates, and chemical routes. As the requirements of purity, phase distribution and other physical characteristics of ceramic powders become more stringent, chemical synthesis methods are becoming more popular. Chemically prepared powders are pure and homogeneous at a molecular level [1]. Their chemical and physical characteristics can be closely controlled. They are synthesized at significantly lower temperatures than conventional ceramic powders. In addition, the costly grinding-refiring steps are eliminated.

One such chemical synthesis route is the solution-polymerization technique, better known as the "Pechini Method" [2, 3]. The technique employs the Pechini resin as the polymeric carrier of the pre-ceramic powders. The resin consists of citric acid, as the chelating agent, and ethylene glycol, to promote polymerization during the esterification process. The cation sources are usually nitrate salts of the metals, mixed in stoichiometric proportions in the aqueous resin solution. Modifications have been suggested to move from costly nitrate salts to more readily available sources, specifically for silicon containing systems [4]. An important aspect in the selection of these cation precursor salts is the aqueous solubility. Alternatives have been suggested to use other resins in order to reduce the cost [5, 6].

In the literature [6–10], several basic reactions are proposed to occur during the formation of the Pechini precursors. The heart of the process is chelation of the dissolved metal ions by the carboxylic acid end of the citric acid which has a configuration ideal for chelating. Polyesterification follows as the temperature of mixture is increased. The chelating action of the organics is suggested to be responsible for the formation of a stable, atomistically homogeneous, pre-ceramic organometallic.

In light of this background, there remains a need for a chemical route to mixed oxide powders which produces powders of high purity at relatively low temperatures and high yields, utilizing readily available and relatively inexpensive starting materials. The present invention addresses these needs.

SUMMARY OF THE INVENTION

Accordingly, one preferred embodiment of the invention provides a chemical process for preparing a mixed metal oxide powder which employs as a carrier a non-chelating polymer. A specific preferred process includes the steps of forming a substantially homogeneous liquid mixture containing cations of at least two metals and a non-chelating polymer containing partially negatively charged functional groups, wherein the mixture contains an excess of the cations relative to the partially negatively charged functional groups on the polymer; removing the liquid from the solution to form a solid precursor material; and, calcining the solid precursor material to form a mixed metal oxide material. In preferred modes of carrying out this process of the invention, the non-chelating polymer is a polyhydroxyl polymer such as polvinyl alcohol or a glycol such as polyethylene glycol. The polymer can be preformed and added to make the mixture, and/or precursor monomers to the polymer can be added and polymerized to form the polymer in situ. In either event, although it is not intended that the present invention be limited by any theory, it is believed that the non-chelating polymer serves to sterically entrap the metal cations in a manner which facilitates the formation of an atomistically homogeneous, pre-ceramic organometallic. Thus, the presence of a chelating polymer, e.g. one derived from citric acid as in the well-known Pechini method, is unnecessary to achieving quality, mixed oxide powders in accordance with the present invention.

Another preferred embodiment of the present invention provides a process for preparing a mixed metal oxide powder, which includes the step of calcining a gel containing cations of at least two metals and a non-chelating polymer so as to form a mixed metal oxide powder compound.

Another preferred embodiment of the invention provides a process for preparing a powder of a metal oxide containing at least two metals in a specified stoichiometric ratio. The process includes the steps of forming a substantially homogeneous liquid mixture containing cations of at least two metals and a non-chelating polymer that is formed in situ with the cations; removing the liquid from the mixture to form a solid precursor material; and calcining the solid precursor material to form the mixed metal oxide powder.

Still another preferred aspect of the invention provides a process for preparing a powder of a metal oxide containing at least two metals in a fixed stoichiometric ratio. This process involves providing a solution comprising a solvent, cations of at least two metals dissolved in the solvent in a stoichiometric ratio, and a carrier polymer dissolved in the solvent, the carrier polymer having negatively charged functional groups, wherein the ratio of the cationic valences of the cations to the partially negatively charged functional groups is about 4:1 to about 12:1. An organometallic precursor gel is formed from the liquid precursor by removing the solvent. The organometallic precursor gel is calcined to form the powder.

Additional embodiments of the invention provide mixed oxide powders prepared by processes of the invention.

The present invention provides chemical routes to mixed metal oxide powders that achieve exceptionally high yields of quality powders while employing relatively low temperatures. Additional objects and advantages of the invention will be apparent from the description that follows.

DESCRIPTION OF THE FIGURES

FIG. 13 shows Table VI listing the powder preparation and processing variables for dicalcium silicate, tricalcium silicate, tricalcium aluminate and tetracalcium aluminate iron oxide.

FIG. 14 shows Table VII listing the crystallization behavior for dicalcium silicate, tricalcium silicate, tricalcium aluminate and tetracalcium aluminate iron oxide, which were obtained using PVA having a high degree of polymerization.

FIG. 15 shows Table VII listing the crystallization behavior for dicalcium silicate, tricalcium silicate, tricalcium aluminate and tetracalcium aluminate iron oxide, which were using PVA having a low degree of polymerization.

FIG. 17 shows a Table IX listing the specific surface area for dicalcium silicate, tricalcium silicate and tricalcium aluminate and tetracalcium aluminate iron oxide.

DESCRIPTION OF THE PREFERRED EMBODIMENTS

Figure 1:
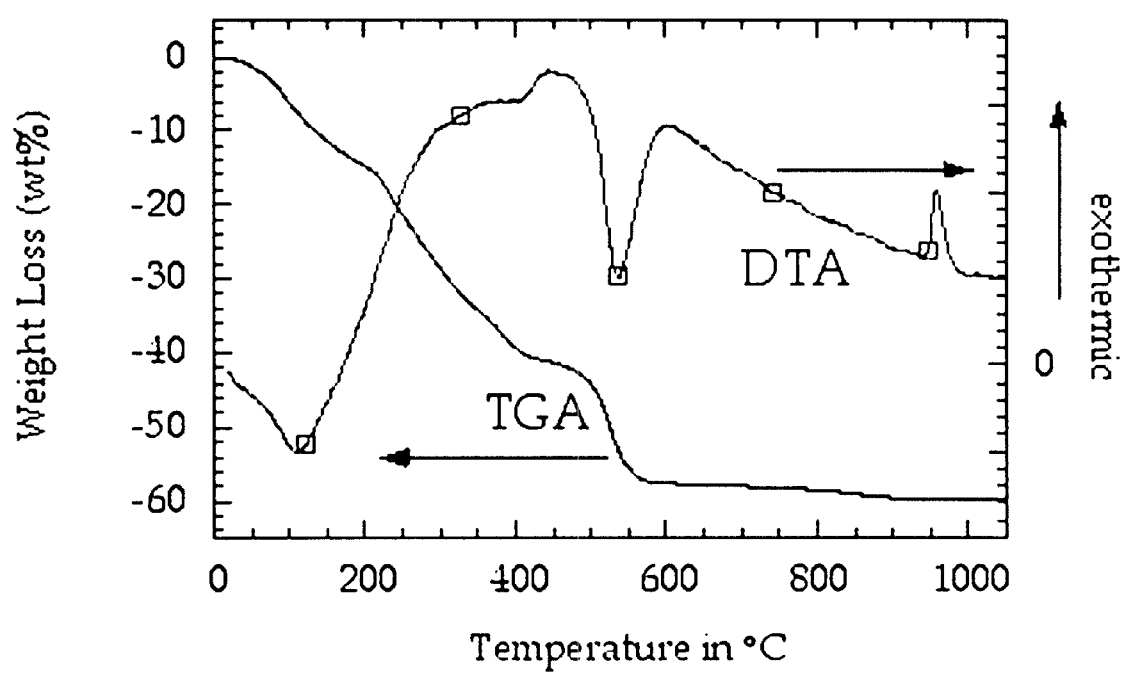
FIG. 1 shows the results of simultaneous DTA/TGA analysis of a pre-ceramic precursor of the present invention.

For the purpose of promoting an understanding of the principles of the invention, reference will now be made to certain preferred embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides organic-inorganic polymerized chemical processes for preparing oxide powders useful in ceramic applications. Certain preferred processes of the invention employ a non-chelating polymer such as a polyhydroxyl polymer as a carrier, which is dissolved in a solvent (desirably in aqueous solution) along with metal salts. Solvent is then removed from the solution to form a solid organometallic precursor gel, which can be processed to form ceramic powders as discussed in greater detail below.

One preferred carrier for processes of the present invention is a polyvinyl alcohol (PVA). The preferred PVA used in the invention is generally water-soluble and of sufficient length to sterically entrap the metal cations, preferably having a degree of polymerization (DP) in the range of up to about 2000. If necessary, during practice of processes of the invention, the PVA can be dissolved in the aqueous phase with heating.

Another preferred carrier for use in the invention is a glycol polymer. Especially preferred are alkylene glycol polymers such as poly($C_2$ to $C_5$ alkylene glycol) polymers, especially polyethylene and/or polypropylene glycol polymers. In this regard, it will be understood that the polymer can be a homopolymer or a copolymer such as a mixed $C_2$ to $C_5$ alkylene polymer, e.g. a mixed ethylene/propylene glycol polymer. Preferred glycol polymers will be of sufficient length to advantageously sterically entrap the metal cations used in the process, for example preferably having an average molecular weight of at least about 100, more preferably having an average molecular weight of about 200–200,000, typically in the range of about 200 to about 10,000.

The selection and use of additional polymer carriers in processes of the present invention will be within the purview of those skilled in the relevant field. In general, it is desired that the polymer be co-soluble in the selected solvent with the metal cations employed, and of sufficient length (e.g. having at least about 20 repeating monomer units) to sterically entrap the cations. In preferred embodiments, it is desired that the polymer have about 400 to about 2,000 repeating monomer units. In one aspect of the invention, the polymers will lack chelating functions such as those which occur in polymers of alpha-hydroxy acids such as citric acid. In addition, where a polar solvent such as water and/or an alcohol (e.g. a $C_1$ to $C_6$ alcohol) is to be used, the polymer will desirably be functionalized with polar groups to facilitate solubility in the solvent. In this regard, it will be understood that if necessary, solvent systems of the invention can be heated, e.g. up to about 100° C., to facilitate dissolution of the polymer and/or cation in the solvent. Also, it will be understood that in certain aspects of the invention a pre-formed polymer carrier will be mixed with the cations, and in other aspects the polymer may be prepared in situ with the cations by the polymerization of an appropriate starting monomer, e.g. by the polymerization of ethylene glycol to form polyethylene glycol (see for instance Example 5 below).

The metal salts used in the present invention will generally be precursor salts to metal oxides useful in forming ceramic powders. A wide variety of suitable water-soluble metal salts are known in the ceramics area and can be used in the invention, including for example salts of aluminum, calcium, chromium, manganese, iron, nickel, copper, strontium, yttrium, zirconium, silver, thallium, barium, lanthanum, bismuth, lithium, sodium, magnesium, potassium, scandium, zinc, rubidium, cadmium, indium, cesium, mercury, lead, cerium, praseodymium, neodymium, samarium, europium, gadolinium, terbium, dysprosium, holmium, erbium, thulium, ytterbium, lutetium, uranium, thorium, cobalt, hafnium, niobium, titanium and molybdenum. A wide variety of anions will likewise be suitable including nitrates, acetates, formates, halides (e.g. chlorides, bromides and iodides), oxyhalides, sulfates and carbonates. The metal salt used will also be soluble in the solvent selected for the process, and in the case of using an aqueous solvent the metal salt will preferably be water soluble.

In accordance with one aspect of the invention a precursor solution will be prepared having dissolved therein the carrier polymer and the metal salts in the desired stoichiometric ratio of the specific metal oxide to be produced. Generally speaking, it will be preferable to include the metal salts in excess relative to any paritially negatively functional groups (e.g. hydroxyl, ether or polar groups) provided by the carrier polymer. Preferably the metal salts are in at least about two-fold excess to the partially negatively charged polar groups. In more preferred processes, the metal salts are in at least about a four-fold excess to the partially negatively charged polar groups.

In another way of calculating loading into the solution, it will be preferable to use the metal cations in stoichiometric excess relative to the number of monomer units of the polymer present in the solution, e.g. such a stoichiometric excess of two or more and even four or more cations per monomer unit can be used. It has been found that such large excesses of cations can be used while nonetheless achieving substantially homogeneous mixed metal oxide powders. In another aspect of the invention, the amount of cations charged to the precursor solution will be sufficiently high to provide a ratio of the valences of the charged cations to functional groups on the polymer to be greater than about 4:1. In preferred forms, the ratio of valences to functional groups is selected to be between about 4:1 to about 12:1, more preferably about 6:1 to about 8:1.

In still another preferred aspect of the invention, the amount of carrier polymer charged to the precursor solution will be sufficiently low relative to the amount of metal cation charged, to provide the product, mixed oxide powder (i.e. after calcination to remove organics) in a weight ratio (polymer:powder) of at least about 0.2:1 to about 1:1; more preferably, such weight ratio will be at least about 0.25:1 to about 0.75:1.

In certain aspects of the invention where the carrier polymer is formed in situ from polymerization of monomer units, the carrier polymer can form the solvent for the precursor solution. In this form, the ratio of cations in solution to carrier polymer can be greater than previously described. Thus, the amount of cations charged to the precursor solution sufficiently high to provide the product, mixed oxide powder in a weight ratio of at least 1:1 relative to the carrier polymer charged, more preferably greater than about 2:1, and most preferably between about 2:1 and about 6:1.

Varying the amount of cations relative to the amount of carrier polymer charged to the precursor solution can provide advantageous properties to the mixed metal oxide powders. For example, use of this inventive process provides-a greater yield of the mixed metal oxide powder based upon the amount of metal cations and polymer charged to the precursor solution. Thus, much less carrier polymer can be used to provide desired mixed metal oxide than can be achieved through other processes such as the Pechini method.

After preparation, the above precursor solution is treated to remove the water or liquid (solvent) and form an organometallic precursor solid containing the carrier polymer and the metal salts. The preferred precursor gel is believed to have the cations substantially homogeneously distributed therein, sterically entrapped by the carrier polymer employed. This precursor solid is generally sponge-like or gel-like in appearance, and can then be processed to form ceramic powders. In particular, it is desirable in one mode of practicing the invention to reduce the gel to particles, and then to calcine the particles sufficiently to substantially remove the organic materials and form a ceramic powder.

Optimization of the amount of carrier polymer charged to the precursor solution can provide ceramic powders having a narrow particle size distribution range. The resulting ceramic powders may be ground, e.g. milled, to further reduce the particle size, e.g. to an average size of less than about 10 micrometers, usually 0.1 $\mu$m to 1 $\mu$m, but could also be 10–20 $\mu$m depending on milling treatment.

Preferred calcination temperatures will be at least about 600° C., and usually will fall in the range of about 600° C. to about 1200° C. It will be understood, however, that the particular calcination temperature used may vary depending upon the starting materials used and the properties of the desired product, and that variation of such temperature will be within the purview of one ordinarily skilled in the field. In this regard, for example, inventive products can be provided in the form of amorphous powders, which may generally be formed at relatively lower temperatures, or crystalline powders, which may be formed at relatively higher temperatures. Illustrative examples of mixed metal oxides having low calcination temperatures and higher crystallization temperatures are provided in Table I.

TABLE I

Summary of Oxide Powders Prepared by Inorganic-Organic Polymerization Method
(Polymeric carrier: poly vinyl alcohol (PVA), poly ethylene glycol (PEG), ethylene glycol (EG)).

| Compound | Heating temperature (° C.) | | Specific surface area (m²/g) | | Particle size ($\mu$m) | |
|---|---|---|---|---|---|---|
| | Calcination | Crystallization | Amorphous | Crystalline | Calcined | Attrition-Milled |
| Alumina ($Al_2O_3$) | 800 | 1150 | 83 | 6.2$^\yen$ | | 0.1–0.3$^\dagger$ |
| β-Cristobalite ($SiO_2$) | 800 | 1100 | 188 | | | 0.3 |
| Mullite ($Al_6Si_2O_{13}$) | 800 | 1300 | 157 | | | 0.1 |
| Zircon ($ZrSiO_4$) | 800 | 1100 | 81 | | | 0.2–0.3 |
| Wollastonite ($CaSiO_3$) | 800 | 800 | | 18 | 0.7 | 0.2$^\dagger$ |
| Calcium aluminate ($CaAl_2O_4$) | 650 | 900 | 12 | | 60 nm (hard aggl.) | |
| Belite (β-$Ca_2SiO_4$ or $C_2S$) | 700 | 800 | | 22.1 | 0.3–0.4 | |

TABLE I-continued

Summary of Oxide Powders Prepared by Inorganic-Organic Polymerization Method
(Polymeric carrier: poly vinyl alcohol (PVA), poly ethylene glycol (PEG), ethylene glycol (EG)).

| Compound | Heating temperature (° C.) | | Specific surface area ($m^2/g$) | | Particle size ($\mu$m) | |
|---|---|---|---|---|---|---|
| | Calcination | Crystallization | Amorphous | Crystalline | Calcined | Attrition-Milled |
| Alite ($Ca_3SiO_5$ or $C_3S$) | 700 | 1400 | | 0.9§ | 3.0–5.0 | 0.2–0.4† |
| $C_3A$ ($Ca_3Al_2O_6$) | 700 | 1000 | | 4.2 | 0.5–1.0 | |
| $C_4AF$ ($Ca_4Al_2Fe_2O_{10}$) | 700 | 700 | | 17.1 | 0.1–0.2 | |
| YAG ($Y_3Al_5O_{12}$) | 600 | 900 | 56 | 17 | | |
| Leucite ($KalSi_2O_6$) | 750 | 1000 | 50 | | | |
| Hexacelsian ($BaAl_2Si_2O_8$) | 800 | 1100 | 79 | | | 0.5 |
| Cordierite ($Mg_2Al_4Si_5O_{18}$) | 800 | 1200 | 181 (attrition milled) | | | 30 nm |
| Barium titanate ($BaTiO_3$) | 700 | 700 | | 5.6 | 0.1 (hard aggl.) | |
| Barium orthotitanate ($Ba_2TiO_4$) | 700 | 1000 | | | | |
| Dysprosium titanate ($Dy_2TiO_5$) | 800 | 800 | | | | 0.2 |
| Yttrium titanate ($Y_2TiO_5$) | 850 | 850 | | | | |
| Alumina zirconia composite ($Al_2O_3.ZrO_2$) | 700 | 1300 | | | | 0.5 |
| Nickel aluminate ($NiAl_2O_4$) | 800 | 1000 | 10 | 4 | | |
| Calcium phosphate ($CaP_2O_6$) | 700 | 900 | | | | |
| Xenotime ($YPO_4$) | 500 | 830 | 12 | | 70 nm (hard aggl.) | |
| Aluminum phosphate ($AlPO_4$) | 800 | 800 | | | | |
| Lithium phosphate ($LiPO_4$) | 700 | 800 | | | | |

§after attrition milling for 1 h: 50 $m^2/g$
¥after attrition milling for 1 h: 55 $m^2/g$
†crystalline form When the amount of carrier polymer charged to the solution is optimized, the amorphous powders, which can be thus obtained exhibit enhanced reactivity. These amorphous powders can provide crystallized mixed metal oxides at significantly lower crystallization temperatures than can generally be obtained from the corresponding mixtures of metal oxides obtained by prolonged heating of mechanical grinding or milling, as is typically done in large scale industrial processes. The reactive amorphous powders also typically have a higher specific surface area.

Illustrative metal oxide powders which can be prepared in accordance with the invention include for example calcium aluminate, yttrium phosphate, lanthanum phosphate, yttrium niobate, lead titanate, dicalcium silicate, tricalcium silicate, tricalcium aluminate, calcium titanate, aluminum titanate, barium titanate, barium, orthotitanate, cordierite, yttrium aluminate, aluminum phosphate, nickel aluminate, lead manganate titanate, and dysprosium titanate. Specific examples can be found in Table II. These and other ceramic powders of the invention can be used in a variety of applications including electronic ceramic applications, e.g. many-component superconducting powders and specialty ceramic powders for the electronics industry. These powders can be used in conventional casting, molding and sintering processes to prepare a variety of useful ceramic objects and devices.

TABLE II

Polymerization Methods and Chemical Sources for Each Compound.

| Polymer carrier | Compound | Chemical source |
|---|---|---|
| Polyvinyl alcohol (PVA) | $Al_2O_3$, $SiO_2$, $Al_6Si_2O_{13}$, $ZrSiO_4$, $CaAl_2O_4$, $Y_3Al_5O_{12}$, $AlPO_4$, $KAlSi_2O_6$, $BaAl_2Si_2O_8$, $NiAl_2O_4$, $Mg_2Al_4Si_5O_{18}$, $CaP_2O_6$, $LiPO_4$, | nitrate salts (most cases), colloidal silica (for $SiO_2$), di-ammonium hydrogen- |

TABLE II-continued

Polymerization Methods and Chemical Sources for Each Compound.

| Polymer carrier | Compound | Chemical source |
|---|---|---|
| | $CaSiO_3$, $Ca_2SiO_4$, $Ca_3SiO_5$, $Ca_4Al_2Fe_2O_{10}$ | phosphate |
| Ethylene glycol (EG) | $BaTiO_3$, $Ba_2TiO_4$, $Dy_2TiO_5$, $Y_2TiO_5$ | nitrate salts, barium nitrite, titanium isopropoxide |
| Polyethylene glycol (PEG) | $Al_2O_3.ZrO_2$ composite | aluminum nitrate, zirconium 2,4-pentane-dionate |

For the purposes of promoting a further understanding and appreciation of the present invention and its advantages, the following Examples are provided. It will be understood, however, that these Examples are illustrative and not limiting in nature.

EXAMPLE 1

Preparation of Calcium Aluminate Powder 1.1 Powder Preparation $Ca(NO_3)_2.4H_2O$ and $Al(NO_3)_3. 9H_2O$ were used as the cation sources. The polymeric precursors were prepared by mixing stoichiometric proportions of the nitrate salts into a 5 wt % aqueous solution of polyvinyl alcohol (PVA). The PVA solutions were made from three types of PVA with three different degrees of polymerization (DP), i.e. DP 1700 (Type A), DP 580 (Type B) and DP 330 (Type C). Type A PVA was dissolved by stirring on a hot plate at 68° C. The other two types were dissolved by stirring at room temperature. The proportions of the PVA to cation sources in the solution were adjusted in such a way that there were four times more positively (+) charged valences from the cations than the negatively (−) charged functional groups of the organics. Solutions were then heated on a hot plate until the water of solution evaporated, and a crisp, light brown, aerated gel formed. This gel was ground and calcined in air at various temperatures for 1 hour. The heating rate for the calcination process was 10° C./min. Some powders were annealed for dwell times of up to 90 hours to promote crystal growth at lower temperatures.

1.2 Powder Characterization

The phase formation in the powders was analyzed as a function of calcination temperature using a powder X-ray spectrometer and CuKα radiation (40 kV and 40 mA). $^{27}$Al MAS-NMR analyses were performed on powders calcined at various temperatures, using a spectrometer based on a Nicolet 1280 data-acquisition system at 11.7 tesla. The samples were spun at about 10 KHz. The FTIR measurements were done on selected samples, using a Nicolet spectrometer at a resolution of 2 cm$^{-1}$.

Pyrolysis. of the ground gel samples was monitored by simultaneous differential thermal analysis and thermogravimetric analysis (DTA/TGA) at a heating rate of 10° C./min.

The effect of calcination temperature on the specific surface area of powders was studied by nitrogen gas adsorption. The surface area data were obtained by five point BET analysis. The particle size distribution of powders was studied using a laser absorption spectrometer (Sedigraph). The powders were suspended in a calibrated non-aqueous dispersing liquid (Sedisperse A-12). The suspension was sonically agitated with a quartz tip ultrasonic processor for 5 min before analysis.

The morphology of powders was studied by scanning electron microscopy. A drop of powder suspended and sonically agitated in isopropyl alcohol was deposited on to an aluminum stub, followed by carbon coating.

1.3 Results

Simultaneous DTA/TGA analysis of the precursors revealed that they undergo a four-step decomposition process (FIG. 1). The first weight loss is observed in the temperature range 80° C. to about 200° C., which is associated with an endotherm in the simultaneous DTA curve. The second major weight loss in TGA and a corresponding exotherm in the DTA curve occur between 220° C. and 400° C., which are followed by the third large reduction in weight between 450° C. and 550° C. This third weight loss is associated with a strong endotherm in the DTA trace. Later, powders gradually lost about 1% of their weight between 600° C. and 900° C. The DTA trace also exhibits an exotherm due to crystallization at about 940° C. which occurs in a region with constant weight.

Figure 2A:
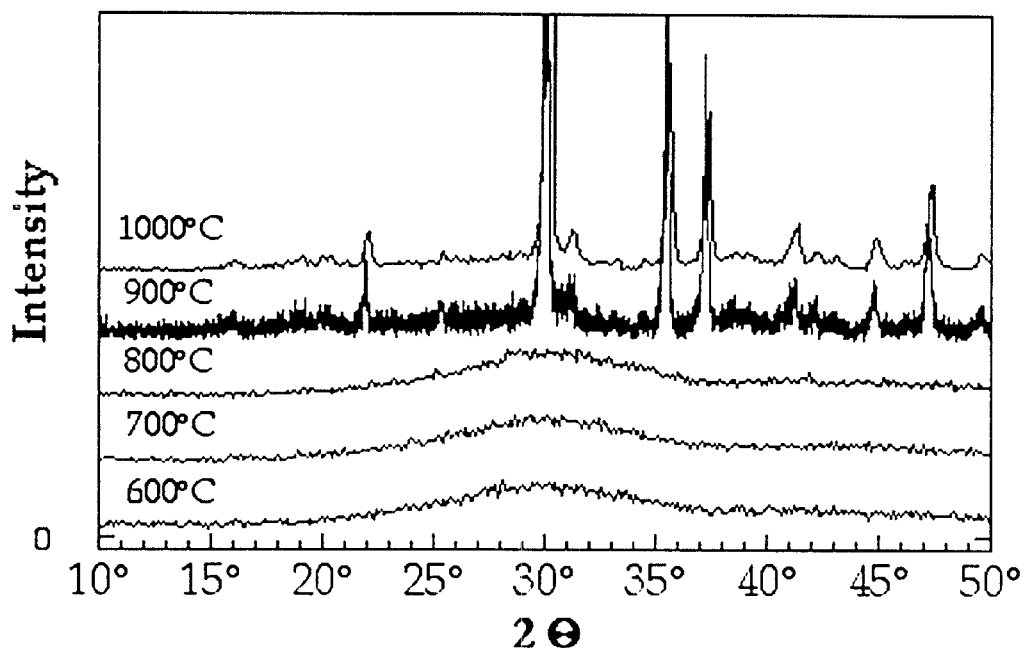
FIG. 2a shows X-ray spectra of powders of the invention calcined for one hour at various temperatures.
Figure 2B:
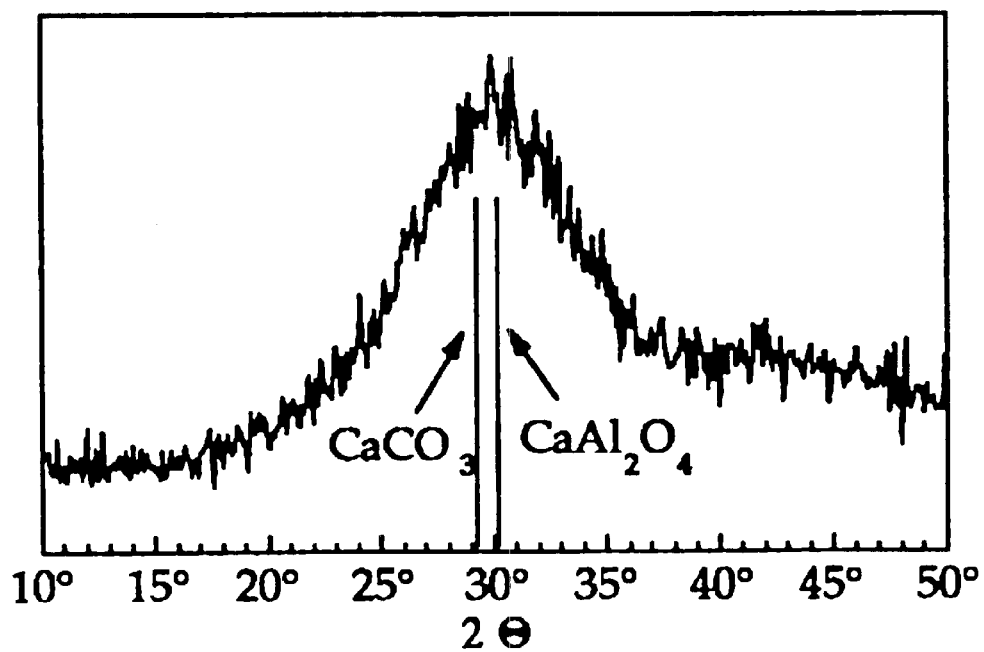
FIG. 2b shows an X-ray spectrum of powders of the invention calcined for sixty hours at 750° C.
Figure 3:
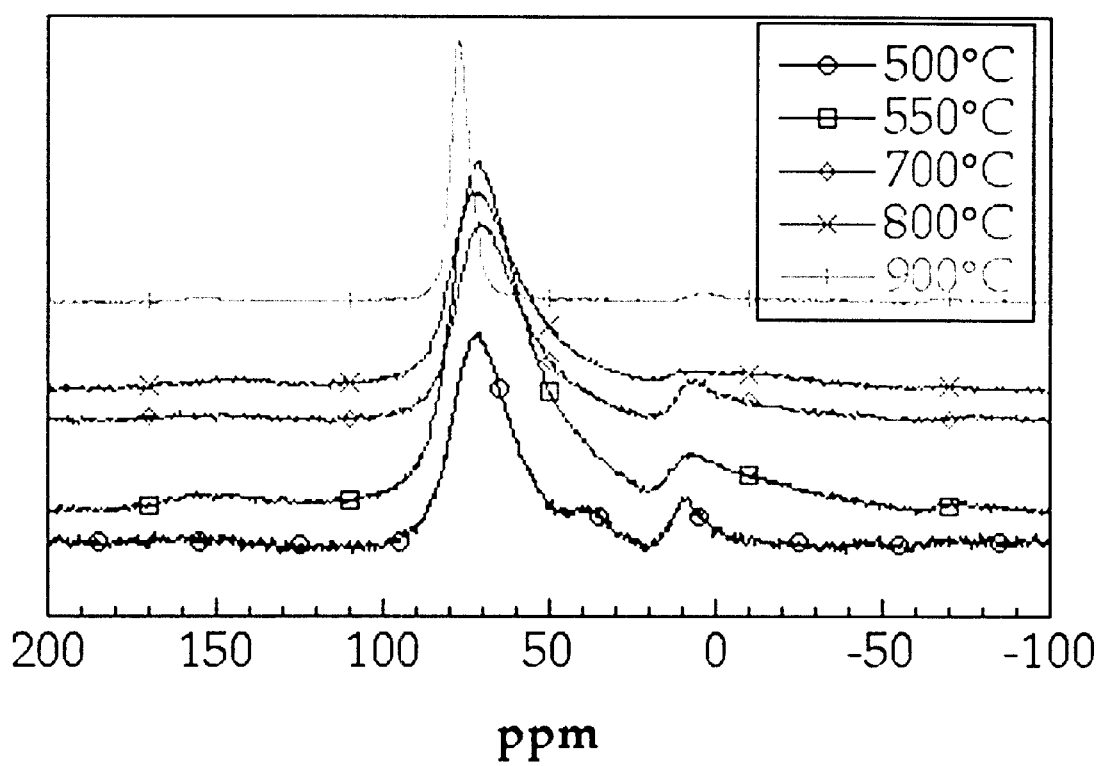
FIG. 3 shows $^{27}$Al MAS-NMR spectra from powders of the invention calcined at various temperatures.

Powders calcined for one hour at the specified temperatures are X-ray amorphous up to 800° C. (FIG. 2). After one hour of annealing at 900° C. the X-ray spectrum of the powders reveal crystalline peaks of $CaAl_2O_4$. Powders calcined at 750° C. for 60 hours and at 850° C. for 1 hour showed evidence of incipient crystallization. The very broad X-ray peak centered around a 2Θ value of 30° covers the range of the most intense peaks of calcium aluminate and also of calcium carbonate. In order to gain more insight into the precursor-to-ceramic conversion, as well as local ordering in these X-ray amorphous-powders, FTIR and NMR analyses were performed. The FTIR analysis of the powder calcined at 600° C. and 800° C. revealed absorption bands usually assigned to carbon-oxygen stretching in inorganic carbonates. A series of $^{27}$Al-NMR analyses on the powders calcined at temperatures 500° C.–900° C. revealed broad peaks at about 10, 40 and 75 ppm (FIG. 3). The peak at 40 ppm was not detected in powders calcined above 550° C. The peak at 10 ppm persisted up to the calcination temperature of 700° C. The peak at 75 ppm progressively became sharper with increasing calcination temperature.

Figure 4A:
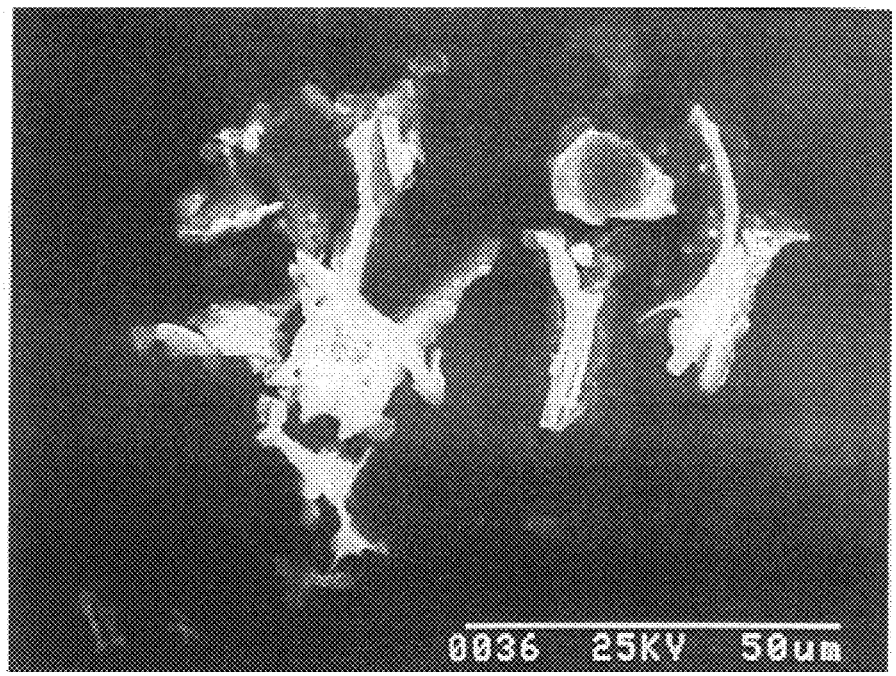
FIG. 4 shows scanned images of SEM micrographs for powders of the invention calcined at 900° C. (4A) and 600° C. (4B).
Figure 4B:
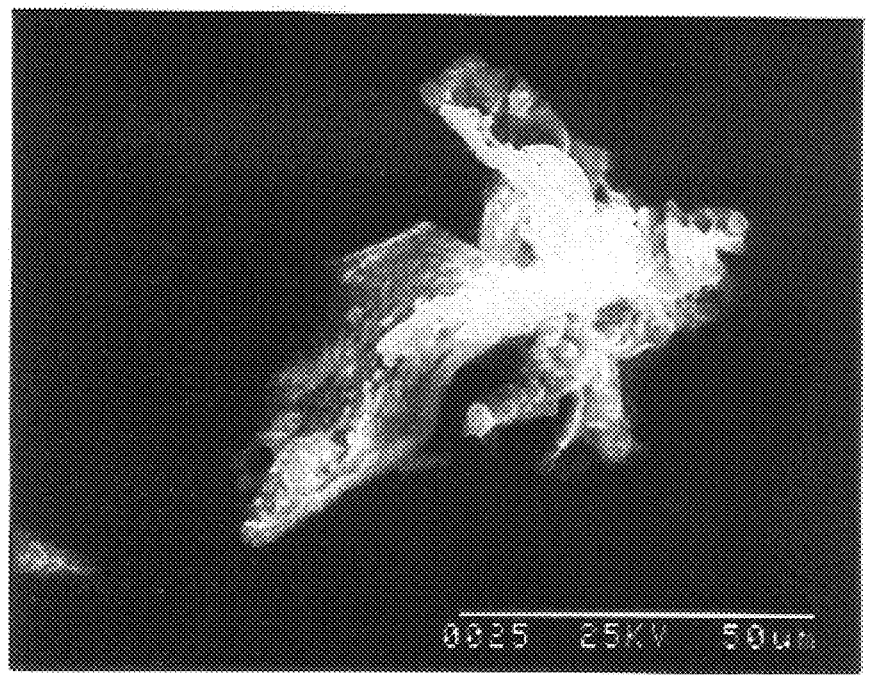

The star-shaped morphology of the mixed oxide powders prepared from the new precursor is unique (FIG. 4). Powders calcined at lower temperatures revealed that the "fins" stretching out from the central "node" are actually made up of small particles (of approximately 2 μm) which sintered together during calcination. SEM investigation showed that most of the particles are in the size range of 10 to 50 μm. The powders prepared with lower DP PVA (Types B and C), resulted in chunkier, more rounded particles as the DP decreased. Powders from the smallest DP PVA (Type C) precursors exhibited a morphology that is similar to the powders prepared through the Pechini method [11].

Figure 5:
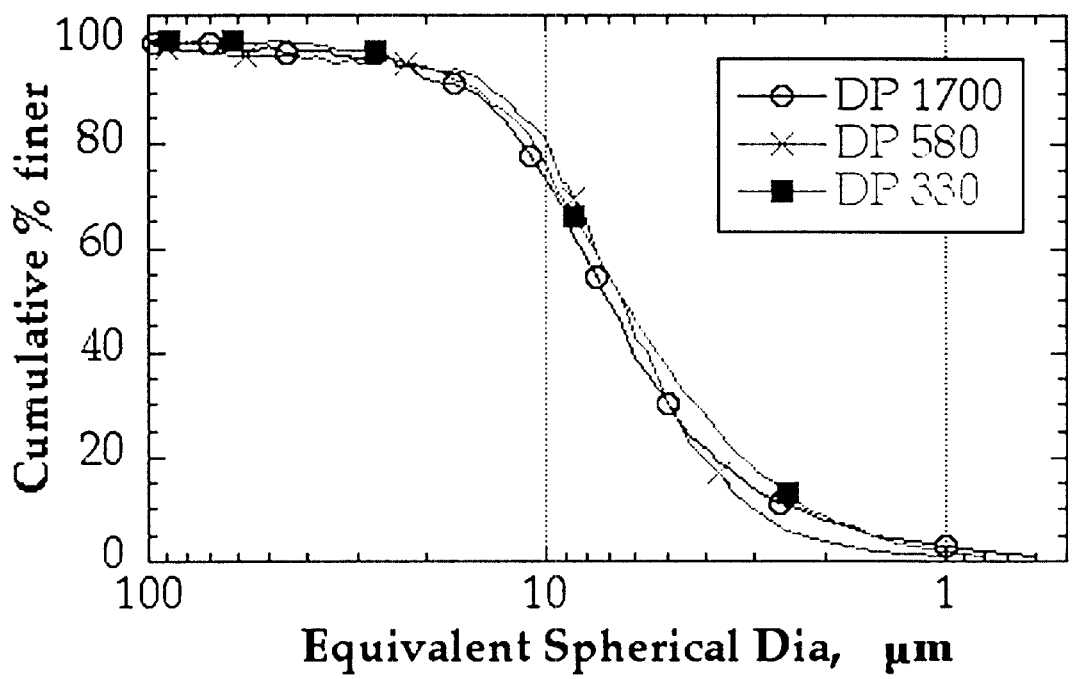
FIG. 5 shows particle size distribution of powders of the invention as a function of the degree of polymerization of the carrier.

Despite this variance in particle morphology, the size analysis of the powders calcined from precursors with different types of PVA showed that the size distributions are very similar to each other (FIG. 5). The median of the distribution (i.e. 50% finer) was about 7 μm for all the powders. Calcination temperatures in the range of 600° C. to 1000° C. also did not have a significant effect on the particle size distribution of these powders.

Figure 6:
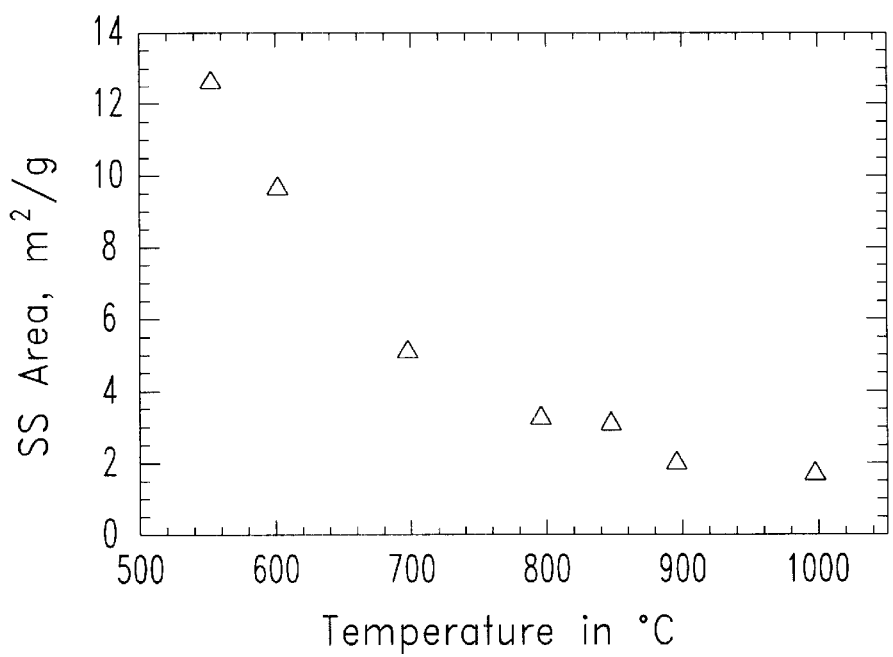
FIG. 6 shows the specific surface area of powders of the invention as a function of calcination temperature.
Figure 7:
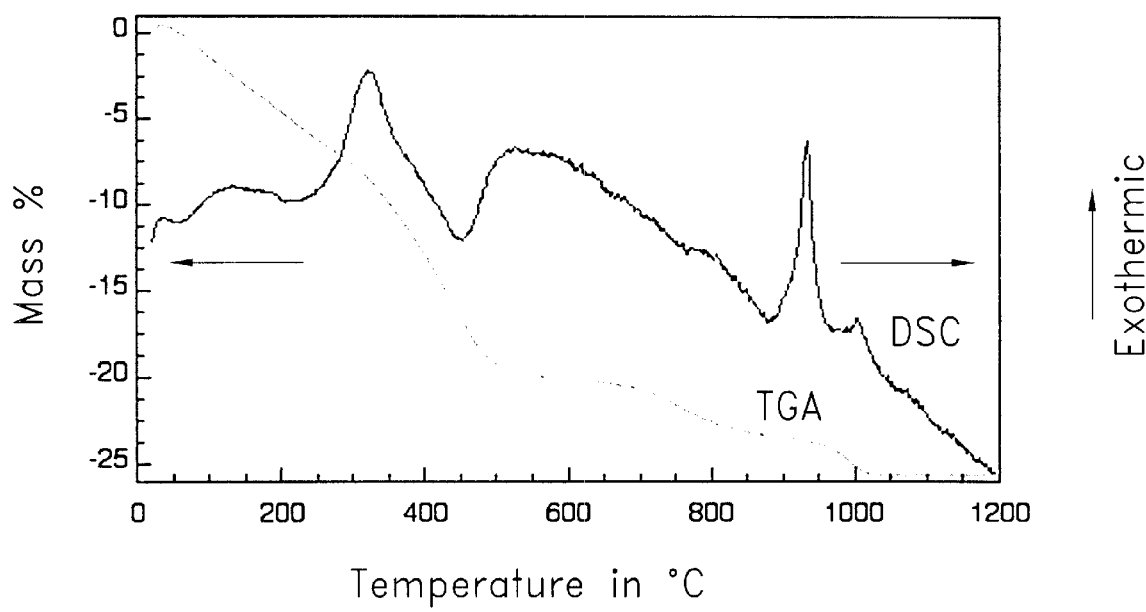
FIG. 7 shows a DSC/TGA plot of precursors for yttrium aluminate powders of the invention.
Figure 8:
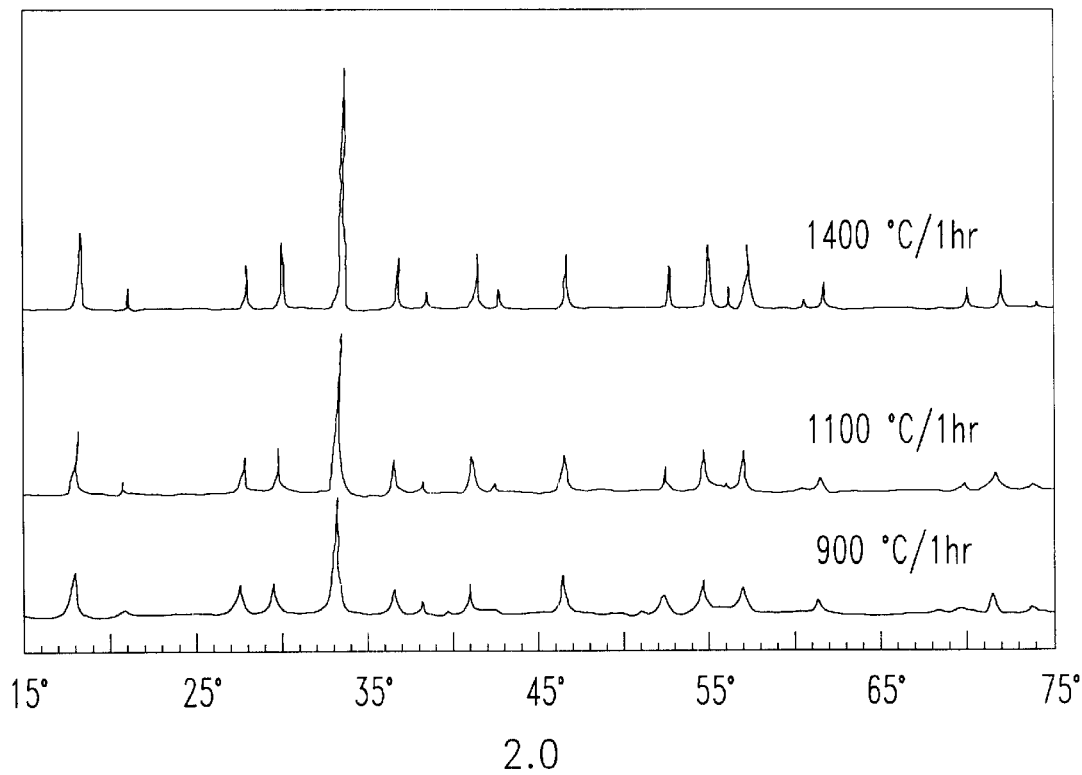
FIG. 8, shows X-ray spectra for yttrium aluminate powders of the invention calcined at various temperatures.
Figure 9A:
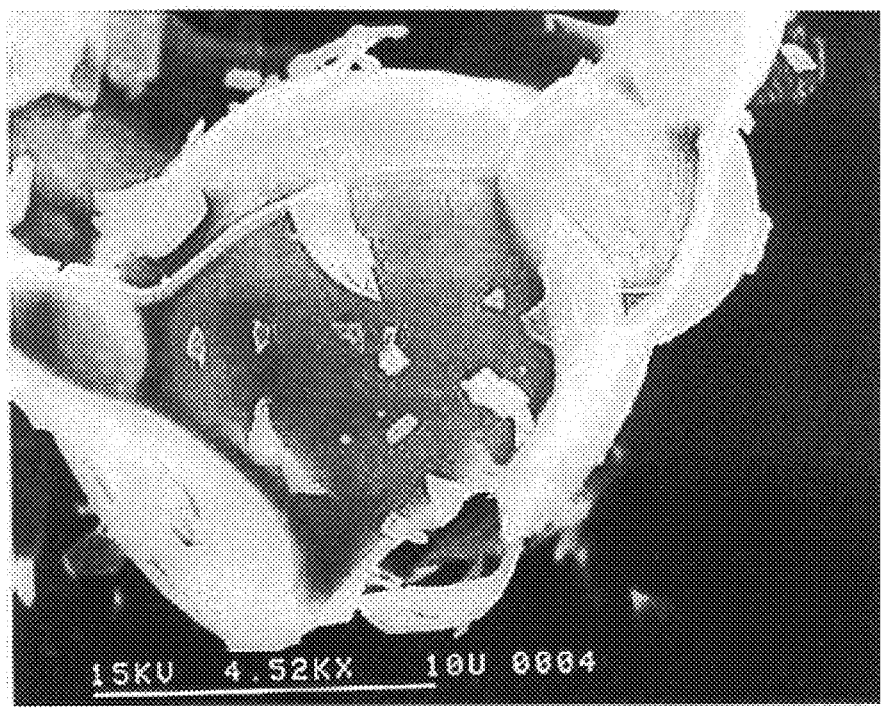
FIG. 9 shows scanned images of SEM micrographs of a yttrium aluminate powder of the invention calcined at 900° C. for one hour.
Figure 9B:
Figure 10:
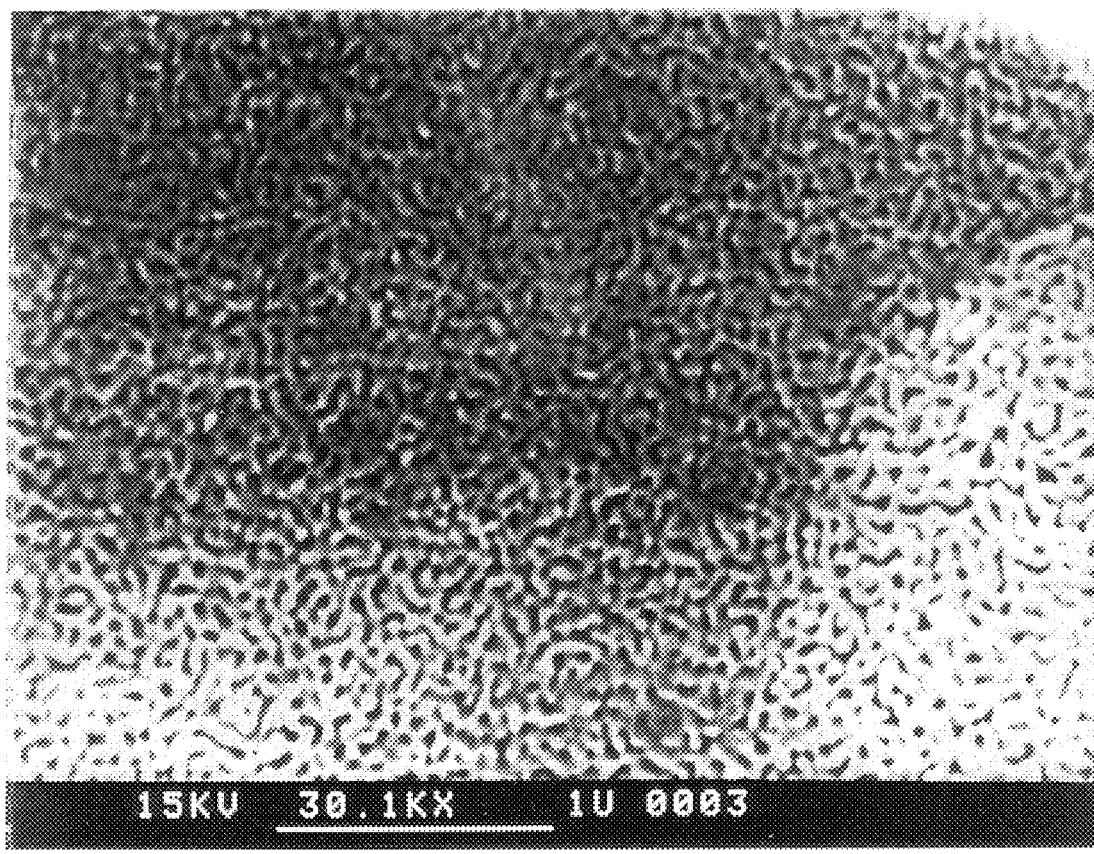
FIG. 10 shows a scanned image of an SEM micrograph of a yttrium aluminate powder of the invention calcined at 1100° C. for one hour.

On the other hand, the specific surface area (SSA) of the same powders showed a strong calcination temperature dependence (FIG. 6). Powders calcined at 550° C. for 1 hour had a BET SSA of 12.5 m$^2$/g, whereas powders calcined at 900° C. for the same time had a SSA of only 2 m$^2$/g.

1.4 Discussion of Results

This solution polymerization technique employing polyvinyl alcohol as the carrier organic phase provided a net yield of about 1.8 by weight ratio of the final mixed oxide powder to the organics used in the process, as compared to about 0.15 for the Pechini method.

The results indicate that chelation of the metal ions by the carboxylic end groups, as in the Pechini resin, is not necessary to obtain stable precursors. Previous results from Pechini precursors with very high metal ion to polymer end group ratios have shown that the resin was able to support a higher amount of cations than it can chelate [11]. In this study, the precursor had a positively charged valence from cations to negatively charged functional end group ratio of 4:1. Despite this large charge imbalance, no precipitation from solution was observed.

X-ray results showed that the powders thus produced are single phase calcium aluminate when calcined above 900° C. Below 900° C. they are X-ray amorphous when calcined for 1 hour. FTIR investigations and X-ray analyses of powders annealed at 750° C. and 800° C. for extended times indicated that there is a small amount of carbonates, possibly calcium carbonate, forming in the system. It was also observed in $^{27}$Al NMR studies, that Al was involved in more than one type of configuration, as shown by the peaks at 10 ppm, 40 ppm, and 75 ppm. These peaks can be assigned to six, five and four-fold coordination, respectively [12]. Al in $CaAl_2O_4$ and $CaAl_4O_7$ is in four-fold coordination in Al—O tetrahedra [13]. The existence of a small amount of six-fold coordinated aluminum and the absorption band in FTIR associated with carbonates is indicative of the formation of some intermediate phases(s) in the precursors below 900° C. The last weight loss below 900° C. in TGA was most likely due to the decomposition of this intermediate phase. TGA results further revealed that most of the weight loss due to the burn-out of the organics in the system occurs below 600° C.

SEM studies with the powders calcined at different temperatures indicated that when calcined at about 600° C. the powders are clusters of smaller round particles. For such equiaxed, smaller particles, one must probably stay at lower calcination temperatures, and break the agglomerates by milling. The effective mean particle size of the calcined powders is about 10–20 μm, as observed by SEM. The discrepancy between particle size measured by sedimentation and that observed in SEM, is probably due to the very shape of these particles. Powders with a morphology of fins stretching out of a central node will have a very small settling rate. Thus, any technique employing particle settling rate and assuming spherical morphology will give results for these powders that are skewed towards smaller particle sizes.

A comparison between the powders prepared in this study and powders prepared from a Pechini precursor showed that the carrier polymer has a significant influence on the morphology of the particles. Powders prepared from a Pechini precursor which uses smaller organic molecules result in chunkier particles with a small aspect ratio. The powders produced in this study are star-shaped with rather high aspect ratio. Furthermore, it was shown that precursors from PVA with smaller DP result in chunkier particles as well. Thus, it appears that using large chain molecules as the polymeric carrier, the solution polymerization technique can be utilized to produce mixed oxide powders with controlled morphology and aspect ratio. Powders with such morphologies as these may have very interesting characteristics as a reinforcing second phase in ceramic matrix composites.

EXAMPLE 2

Preparation of Calcium Aluminate and Yttrium Aluminate Powders 2.1 Preparation of Powder A simple polymerized organic-inorganic complex route based on polyvinyl alcohol (—[$C_2H_4O$]—$_{n'}$ PVA) as the organic carrier for the cations was used to process pure, mixed-oxide powders of calcium aluminate and yttrium aluminate (YAG). Nitrate salts [$Ca(NO_3)_2 \cdot 4H_2O$ (Reagent grade, EM Sci., Gibbstown, N.J.), $Al(NO_3)_3 \cdot 9H_2O$, and $Y(NO_3)_3 \cdot 5H_2O$ (Reagent grade, Aldrich Chem. Co., Milwaukee, Wis.)] were used as the cation sources. The polymeric precursor for calcium aluminate was prepared by mixing stoichiometric proportions of the nitrate salts into a 5 wt % aqueous solution of 100% hydrolyzed PVA. For yttrium aluminates (YAG), 78% hydrolyzed PVA was used. The PVA solutions were prepared by stirring on a hot plate at 68° C. The amount of PVA to cation sources (i.e. nitrates) in the solutions was adjusted such that there were four times more positively (+) charged valences from the cations than the negatively (−) charged functional ends of the organics. Solutions were then heated on a hot plate until the water of solution evaporated,. and a crisp, light brown, aerated gel formed. No precipitation was observed during the solution to gel conversion. This gel was ground with a mortar and pestle after which it was calcined in air at various temperatures. The heating rate for the calcination process was 10° C./min. The calcined samples as well as the precursors were studied for phase distribution using. X-ray powder diffractometry. Simultaneous differential scanning calorimetry (DSC) (Model STA 409, Netzsch Gmbh, Selb, Germany) and thermogravimetric analysis (TGA) (Model STA 409, Netzsch Gmbh, Selb, Germany) were used to obtain crystallization temperatures and percentage weight losses, respectively. Scanning electron microscopy (SEM) (Model DS-130, Intl. Scientific Instruments, Milpitas, Calif.) was used to examine the average grain sizes and morphology of the powders. The powders were gold coated prior to SEM examination.

2.2 Results and Discussion of Results

Most of the organics were burned off the organometallic precursor below 600° C., as indicated by strong exotherms in DTA (or DSC) as well as the large weight loss in TGA curves in this temperature range. The inventive process produced X-ray amorphous, fine, white powders at temperatures as low as 650° C. Exotherms observed at around 900° C. and 950° C. for calcium aluminates and YAG, respectively, were due to crystallization. A small weight loss in both powders at high temperatures (around 860° C. for $CaAl_2O_4$ powders and around 1100° C. for YAG powders) is believed to be due to the decomposition of X-ray amorphous, intermediate phases. X-ray analysis showed that these powders formed a single phase, crystalline mixed oxide of calcium aluminate or yttrium aluminate, when annealed at 900° C. for 1 hour.

Calcium aluminate powders thus prepared had 12 $m^2/g$ of specific surface area as measured by BET. When calcined below 700° C. calcium aluminate powders were agglomerates consisting of smaller primary particles of 1 to 2 microns in size. At 900° C., the particles started fusing together, presumably during the calcination process, and formed highly angular, dendritic agglomerates of calcium aluminate. Yttrium aluminate powders were also agglomerates consisting of primary particles as small as 50–100 nm. The SEM analysis of YAG-powders calcined at 900° C. and 1100° C. revealed that the high surface area in these powders is a consequence of the decomposition reactions at 1100° C. It was observed that most of the surface area was due to the internal porosity created during this decomposition.

The agglomerates in both cases could easily be ground to primary particles by ball milling. The as-calcined agglomerate size of these powders was 10 to 20 μm as observed by SEM. The particle size analysis for $CaAl_2O_4$ as measured by sedimentation techniques gave a much smaller particle size distribution, likely due to the irregular shapes of the agglomerates.

The net yield of the new route was approximately 2.0 by weight ratio of the final mixed oxide powder to the organics used in the process.

EXAMPLE 3

Preparation of Cordierite Powders

In this Example, processes of the invention employing a PVA solution were compared to processes employing the Pechini resin as a carrier of the preceramic powders.

3.1 Powder Preparation and Sintering

The powders were synthesized from $Mg(NO_3)_2 \cdot 6H_2O$ (reagent grade, Aldrich Chemical Co., Milwaukee, Wis.); $Al(NO_3)_3 \cdot 9H_2O$ (reagent grade, Aldrich Chemical Co., Milwaukee, Wis.) and Ludox AS-40 Colloidal silica (40 wt % suspension in water, Du Pont Chemicals, Wilmington, Del.). For each precursor, the nitrate salts and the colloidal silica were dissolved in deionized water in stoichiometric proportions. As an organic carrier, either the Pechini resin or the PVA solution was added to the mixture. The 85 wt % Pechini resin, which consisted of 50 mol % citric acid monohydrate and 50 mol % ethylene glycol, was used in this process. The PVA solution was made from 5 wt % PVA (DP=1700) dissolved in water. The proportions of the PVA to cation sources in the solution were adjusted to give 4 times more positively charged valences from the cations than the negatively charged functional ends of the organics. The resulting solutions were heated and stirred until a crisp, aerated gel was formed. The gel was finely ground and calcined in an air at 750° C. for 1 hour.

The calcined powders were attrition milled at 180 rpm for various milling times to produce finer particles. The charge to the mill included 10 g calcined powders with 700 g zirconia ball media (ball diameter 5 mm). The jar volume was 600 ml, and 100 ml isopropyl alcohol was used as a solvent for milling. The attrition milled and dried powders were each uniaxially pressed at 20 Mpa followed by isostatic pressing at 25,000 psi for 10 min. The pellet-shaped green compacts were sintered at various temperatures, with 1 hour soaking time, and the furnace was cooled to room temperature.

3.2 Characterization of Powders

The particle size distributions and specific surface areas of powders were studied using an X-ray absorption spectrometer (Sedigraph Model 5000ET, Micromeritics) and nitrogen gas absorption (Model ASAP 2400, Micromeitics, Norcross, Ga.). The phase variation of the precursors for cordierite was examined as a function of temperature using an X-ray spectrometer (Dmax automated powder diffractometer, Rigaku/USA, Danvers, Mass.) operated with CuKa radiation (40 kv and 40 mA). The density for the sintered specimens was estimated by the Archimedes method using distilled water as the displacement liquid. The relative density was calculated using the density of the a-cordierite (2.512 g/cm$^3$) as the theoretical density. The linear shrinkage behavior of compacted amorphous cordierite as a function of temperature, and the thermal expansion coefficient of the sintered specimens were determined using a dilatometer (Netzsch Dilatometer, 402E, Germany) with a heating rate of 10° C./min. The morphology of powders and microstructure of sintered bodies were studied by scanning electron microscopy, SEM (ISI DS-130, International Scientific Instruments, Santa Clara, Calif.) and transmission electron microscopy, TEM (Philips EM-420, Philips instruments, Inc., Mahwah, N.J.) equipped with energy dispersive spectroscopy, EDS (EDAX PV 9900, EDAX International, Inc., Prairie View, Ill.). The SEM samples were prepared by polishing and chemical etching in 20% HF for 30 sec. For TEM powder specimens, holey formvar films were supported on copper grids. Some powder was then sprayed on the film and carbon coated. The TEM specimen for sintered cordierite was prepared by standard ceramic polishing, dimpling and ion-milling techniques.

3.3 Results: Densification Behavior and Phase Changes

Both precursors were soft, porous and easy to grind. A very fine powder was obtained by hand grinding for a few minutes. The powder derived from the Pechini resin had a narrow particle size distribution with particle sizes ranging from 3 $\mu$m to 50 $\mu$m. Most of the particles were of irregular shape with sharp corners and edges. In the case of the powder derived from PVA solution, though the powder morphology was very similar to the powder prepared with Pechini resin, it had a wider particle size distribution with particle sizes ranging from 1 $\mu$m to 100 $\mu$m.

The variation of phase for amorphous cordierite derived from the Pechini resin as a function of heating temperature was studied. Crystalline spinel phase appeared at 900° C. and persisted till 1250° C. On the other hand, silica remained amorphous up to 1150° C. As the temperature further increased to 1200° C., amorphous silica crystallized to quartz. α-Cordierite started to form at 1250° C. by the solid-state reaction between quartz, cristobalite and spinel. The α-cordierite was formed directly, without a sequential formation of crystalline cordierite (amorphous→$\mu$→α). All phases turned to α-cordierite at 1350° C.

Study of the X-ray diffraction spectra of amorphous cordierite derived from PVA solution showed that the precursor remained amorphous at 900° C. However, in contrast to the Pechini resin process, $\mu$-cordierite appeared with crystalline spinal at 1000° C. The $\mu$-cordierite was detected below 1200° C. and coexisted with α-cordierite at a temperature ranging from 1100° C. to 1200° C. However, as the temperature increased to 1200° C., $\mu$-cordierite phase disappeared and crystallized to α-cordierite. The onset temperature of (α-cordierite was lower than for the Pechini resin process. Only α-cordierite remained at-1300° C.

In the study of the linear shrinkage of amorphous-type cordierite compacts as a function of temperature, the cordierite compact prepared with the PVA solution was observed to densify rapidly between 700° C. and 1000° C. However, the densification stopped at the temperature of crystallization of $\mu$-cordierite. At temperatures above 1200° C., the powder compact continued to swell slightly. On the other hand, the densification of the powder compact prepared with the Pechini resin occurred continuously until α-cordierite was formed at 1250° C. The densification was not affected by the crystallization of spinel phase. These results indicate that the densification, in both cases, stops at the crystallization point of amorphous silica. The powder compact derived from the Pechini resin also showed slight swelling above 1300° C.

The bulk density of sintered specimens derived from PVA solution had a maximum value at 1100° C. The bulk density of (α-cordierite measured higher than the true density in the temperature range from 1000° C. to 1200° C., because $\mu$-cordierite and spinel phase were the matrix phases of the sintered body. The reduction in density above 1100° C., which is related to the swelling in the shrinkage curve, may be ascribed to the formation of α-cordierite, with no more densification occurring. In the case of the powder compact derived from Pechini resin, the maximum density was displayed at 1250° C. and then a reduction in density occurred as α-cordierite formed. A measured bulk density higher than the true density of α-cordierite at above 1100° C. was attributed to the spinel, quartz and cordierite-type glass phases in the matrix. Even though only α-cordierite was detected in the sintered body by X-ray diffraction at 1350° C., the fact that the density was higher than true density of α-cordierite indicated that cordierite-type glass phases still remained in the matrix after densification.

Moreover, the thermal expansion coefficient (3.8×10$^{-6}$/° C.) of the sintered specimen was higher than that of pure α-cordierite. This result confirmed that the sintered body did not consist of only α-cordierite, but also had some cordierite-type glassy phases. In contrast, the close match of the thermal expansion coefficient (2.1×10$^{-6}$/° C.) of the sintered specimen prepared with PVA solution with that of α-cordierite shows that the sintered specimen had high purity. The low thermal expansion coefficient indicated that most of the $\mu$-cordierite and the other phases changed into α-cordierite through solid-state atomic diffusion above 1100° C.

3.4 Results: Densification Behavior of Attrition Milled Powder

The variation of linear shrinkage and density of compacted amorphous cordierite as a function of attrition milling time was studied. In general, longer attrition milling times led to larger shrinkage. Nearly 29% linear shrinkage occurred in the sample sintered at 950° C. when the milling was done for only 15 min. The shrinkage improved remarkably up to the milling time of 60 min. The change in shrinkage with increasing milling time was insignificant after 60 min. in this work. A large shrinkage of about 36% was observed when the milling was done for 60 min. The 36% shrinkage was obtained when the specimen was sintered at 950° C., a temperature below that necessary for crystallization to $\mu$-cordierite. The density of the specimens sintered at 950° C. was higher than the true density for all milling times, because the main phases of the matrix were amorphous silica and some μ-cordierite. In the case of a specimen sintered at 1300° C., the shrinkage for the same milling time was a little lower than that of the specimens sintered at 950° C. because of the formation of α-cordierite with no more viscous-flow sintering. Accordingly, the density also decreased due to the open structure caused by formation of α-cordierite. The measured thermal expansion coefficient of the specimen, attrition milled for 60 min and sintered at 1300° C., was $2.2 \times 10^{-6}$/° C. Both the density and the thermal expansion coefficient of this specimen were quite close to those of pure (α-cordierite. Observation of a transmission electron micrograph of the amorphous cordierite powder attrition milled for 60 min revealed that the powder consisted of very fine primary particles, 30 nm in size, and had a BET specific surface area of 181 $m^2$/g. EDS microanalysis showed that the attrition milled and calcined powder retained a stoichiometric composition of cordierite, and only 0.01 wt % impurity was added during the attrition milling. In addition, the average composition calculated from 3 data points by EDS analysis showed that the powder had a uniform spatial distribution of constituent phase on a nano-size scale. The micrograhs of the polished and chemically etched surfaces of the specimens, attrition milled for two different times and sintered at 1300° C., revealed that both microstructures were much more dense than that of a specimen which was not attrition milled. In case of the specimen attrition milled for 60 min, the pore size was smaller than the specimen attrition milled for 240 min. In analyzing a TEM bright-field internal texture and corresponding SAD pattern of the specimen attrition milled for 60 min, the cordierite crystallite, approximately 0.8 μm in diameter, was observed and the SAD pattern showed reflections from crystalline α-cordierite called indialite (stable hexagonal form) without any amorphous ring pattern.

EXAMPLE 4

Preparation of Calcium Aluminate and Yttrium Aluminate Powder Using PVA and PEG Polymers 4.1 Experimental Procedure Nitrate salts (e.g. $Ca(NO_3)_2 \cdot 4H_2O$ (Reagent grade, EM Sci., Gibbstown, N.J.), $Al(NO_3)_3 \cdot 9H_2O$ and $Y(NO_3)_3 \cdot 5H_2O$ (Reagent grade Aldrich Chem. Co., Milwaukee, Wis.)) were used as cation sources. The polymeric precursor for the calcium aluminate was prepared by mixing stoichiometric proportions of the nitrate salts into a 5 wt % aqueous solution of PVA. Solutions were prepared from 100 mol % hydrolyzed PVA (MW 50000, Aldrich Chem. Co., Milwaukee, Wis.) and several types of 78 mol % hydrolyzed PVA with different degrees of polymerization (DP), i.e. DP 1700 (KH-17s Gohsenol, from Nippon Gohsel Co., Japan), DP 580 (405-S, from Kuraray Co., Japan) and DP 300 (403-S, from Kuraray Co., Japan). For yttrium aluminates, 78 mol % hydrolyzed PVA (kH-17s Gohsenol, DP 1700), and nitrate salts of the metals were used. 100 mol % hydrolyzed PVA solutions were prepared by stirring on a hot plate at 68° C. 78 mol % hydrolyzed PVA solutions were stirred at room temperature. Phosphoric acid was used as the source for $PO_4^{3-}$ in $YPO_4$.

As in the previous Examples, the amount of PVA to cation salts (i.e. nitrates) in the solution was adjusted in such a way that there were 4 times more positively charged valences from the cations ($Me^{n+}$) than negatively charged-functional groups of the organics (in the case of PVA, —OH groups). To further illustrate the mechanism of steric entrapment of the cations in the network of entangled polymer in the absence of functional groups, polyethylene glycol (PEG) was also demonstrated as the polymeric carrier. The concentration of the cations in the solution, in this case, was adjusted such that for every monomer unit of the polymer, there were four positively charged valences in solution. The precursor solutions were then heated on a hot plate until the water of solution evaporated, and a crisp, light brown, aerated gel formed. This gel was ground with an agate mortar and pestle after which it was calcined in air at various temperatures.

The phase formation and precursor to ceramic powder conversion were studied by differential thermal and thermogravimetric analyses (DTA/TGA, (Model STA 409, Netzsch GmbH, Selb, Germany)), and by x-ray powder diffractometry (XRD, (Dmax Automated Powder diffractometer; Rigaku/USA, Danvers, Mass.)). Solid state NMR and FTIR spectrometries were used to gain information about the structure and chemistry of precursors as well as amorphous and crystalline powders. Raman spectroscopy of YAG powders was performed using a micro-raman spectrometer (Jobin Yvon T64000). Surface area measurements were made by five-point BET analysis, and the particle size was studied using a laser absorption spectrometer. Selected powders were examined by SEM and TEM. A description of chemical synthesis and characterization of the powders is also found in [14,15].

4.2 Results

Thermal analysis of the precursors for the mixed oxides showed that most of the organics and other volatiles burned off below 650° C. A slight weight loss (~2 wt %) occurred above 900° C. in the calcium aluminate and yttrium aluminate systems.

Pure, fine and amorphous powders were obtained at temperatures as low as 650° C. Corresponding crystalline powders, i.e. $CaAl_2O_4$ or $Y_3Al_5O_{12}$ or $YPO_4$ were produced when precursors were calcined at 900° C. for about an hour. The powders thus prepared were single-phase and pure as determined by XRD. Similar results were obtained in the experiments employing PEG as the polymeric carrier in the precursor.

FTIR and NMR studies of the powders calcined at various temperatures between 500° C. and 900° C. were performed to gain more insight into the structure and composition of the amorphous powders, and to characterize the gel-to-ceramic conversion. For the powders calcined at 600° C. and 800° C. for an hour, IR study revealed absorption bands at 1421 and 1493 $cm^{-1}$ that are usually associated with carbon-oxygen stretching in inorganic carbonates. A Raman spectrum of the YAG precursors showed a band at 1051 $cm^{-1}$ that is typical of carbonates.

Besides precursors with cations, pure 78% hydrolyzed PVA powders and a "bare" PVA gel were studied by FTIR before calcination. The latter was treated in exactly the same way as the precursors with the cations. However, it did not. contain any metal ions in its structure. FTIR spectra from pure 78% hydrolyzed PVA powders and the "bare" PVA gel showed essentially the same spectra. Besides the bands associated with $CH_2$, $CH_3$, and OH groups, the bands due to the acetate groups were observable in the spectra. The major differences between the spectra from the "bare" PVA gel and the YAG precursor lay in the regions from 1000 to 1700 $cm^{-1}$ and 2700 to 3700 $cm^{-1}$. Interaction of the metal ions with the acetate and hydroxyl groups caused spectral changes in the regions 1000 to 1700 $cm^{-1}$ and 3000 to 3800 $cm^{-1}$. The most important difference was the disappearance of the bands associated with the $CH_2$ and $CH_3$ stretches at 2700 to 3000 $cm^{-1}$ for the YAG precursors.

In a series of $^{27}$Al-NMR analyses from calcium aluminate powders calcined at temperatures 500–900° C., three distinct peaks at 10, 40 and 75 ppm were detected at low temperatures. As the calcination temperature was raised above 500° C. the peak at 40 ppm disappeared. However the peak at 10 ppm was detected up to 700° C. The peak at 75 ppm progressively became sharper with increasing calcination temperature and shifted to 80 ppm at 900° C.

When calcined at low temperatures (i.e. 650 to 800° C.), the powders prepared via the method of the invention had a BET specific surface area of about 12 m$^2$/g. Electron microscopic studies (SEM, TEM) of the powders revealed that most of the surface area was due to the interconnected, internal porosity. The particles were agglomerates of smaller primary particles approximately 50 to 100 nm in size. The morphology of the agglomerates was closely related to the chain length of the polymeric carrier, i.e. PVA [14, 15]. Smaller molecular weight PVA resulted in round hollow agglomerates, whereas longer PVA chains yielded star-shaped, dendritic agglomerates.

4.3 Discussion

As the x-ray studies showed, uniform, amorphous powders were obtained at low temperatures in accordance with the present invention. As the temperature was raised to above 900° C. crystalline powders of the corresponding stoichiometries were produced.

FTIR analyses of the powders calcined at lower temperatures (e.g. at 600° C. and 800° C.) revealed a dublet around 1400 to 1500 cm$^{-1}$. This is the wavenumber region where carbonates usually have their absorption band. However, the existence of a dublet instead of a single band, as well as absence of any crystalline peak in the X-ray spectra were indicative of amorphous compounds. The Raman studies of similar powders detected bands associated with carbonates. $^{27}$Al NMR studies conducted with a calcium aluminate precursor calcined at lower temperatures showed that Al was involved in more than one type of configuration in these powders. The peaks at 10, 40 and 75 ppm could be assigned to six, five and four-fold coordination of the Al atom, respectively [16]. Al is in four-old coordination in Al—O tetrahedra of CaAl$_2$O$_4$ and CaAl$_4$O$_7$ [17]. Thus, the existence of a small amount of six-fold coordinated aluminum along with FTIR and Raman results indicated that powders calcined at temperatures lower than 900° C. contained amorphous carbonate-like compounds. The amount of this compound decreased as the calcination temperature was raised, as observed in the weakening of the absorption band in the FTIR spectra.

Vibrational spectroscopic analyses (FTIR, and Raman) of "bare" PVA gel and the precursors for the mixed oxide indicated the existence of residual nitrates and amorphous carbonates in the organic precursor below 500° C. The bands for nitrates and carbonates as well as the shifts in the acetate groups (1000–1700 cm$^{-1}$) due to metal ion chelation were detected in the precursors. Also the band for the hydroxyl group (3000–3800 cm$^{-1}$) was skewed towards higher wavenumbers due to the interactions with the metal ions. The most striking difference between the spectra of bare and metal ion loaded PVA gels was the disappearance of the CH$_2$ vibrations of the carbon backbone in the spectrum of the precursors. Since the bare PVA gels were treated in the same way as the precursors, the observed changes were note due to degeneration of the PVA during processing. The spectrum from the bare PVA films showed bands corresponding to CH$_2$ vibrations in the 2700 to 3000 cm$^{-1}$ region. This phenomenon is believed to be indicative of the metal ions being trapped between the PVA chains in this highly entangled-polymer network such that the interchain interactions between the PVA chains are reduced or eliminated [18–19].

The results of these experiments further indicate that the metal ions in the organic precursor can be physically stabilized within an entangled polymer network. The new synthesis method differs from solution polymerization techniques, such as the Pechini process and its many derivatives, in two aspects: (i) The organic phase is a long chain, and does not require polyhydroxyl alcohols (such as ethylene glycol) to promote polymerization; ii) The polymer does not need to have a chelating functional group.

EXAMPLE 5

Preparation of Dysprosium Titanate Powder 5.1 Experimental Procedure

Figure 11:
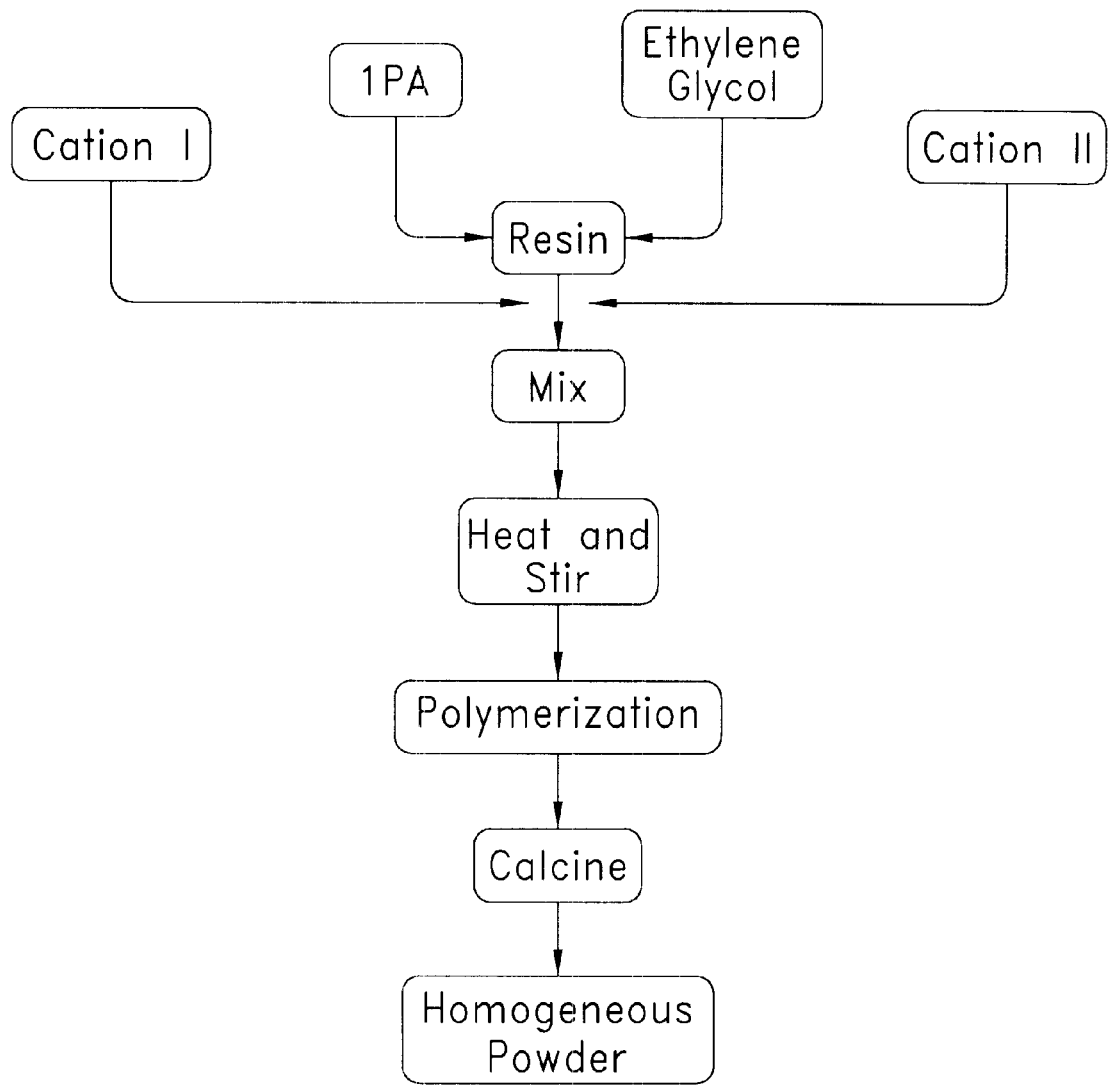
FIG. 11 summarizes the inventive preparative process for a titanate powder as described in Example 5, infra.
Figure 12:
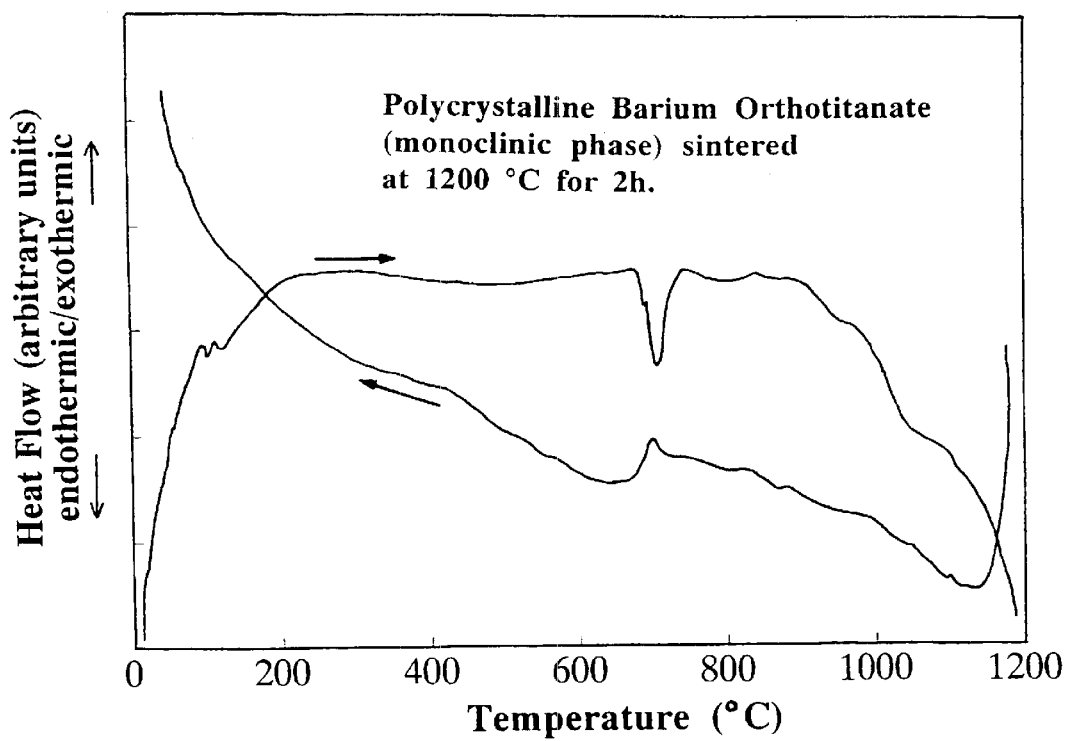
FIG. 12 shows a dilatometry curve for polycrystalline barium orthotitanate sintered at 1200° C. for 2 h.

Dysprosium titanate (Dy$_2$TiO$_5$) powder was prepared using ethylene glycol (EG. Fisher Chemicals, Pittsburgh, Pa.) which was polymerized by heating in situ to provide the carrier polymer. The precursors used were Titanium (IV) Isopropoxide (TISO, Alfa Aesar, Ward Hill, Mass.) and dysprosium nitrate pentahydrate (RhonePoulene Basic Chemical Co., Shelton, Conn.). Due to the reactive nature of the TISO in water, its decomposition was delayed by mixing it with isopropyl alcohol (IPA). FIG. 11 summarizes the preparation process.

The crystallization temperature and weight loss were studied with simultaneous differential thermal analysis and thermogravametric analysis (DTA/TGA. Model STA 409. Netzsch GmbH, Sleb, Germany). From the DTA/TGA, the crystallization temperature was seen to be around 830° C. Therefore, calcination of the powder started at 830° C./1 hour. The powder at 830° C./1 hour was ball milled for 46 hours using a yttria stabilized zirconia media and was pressed with a uniaxial hydraulic press (Carver, Menomonee Falls, Wis.) then cold isostatically pressed. Other calcination temperatures/holding times were 1000° C./1 hour, 1300° C./1 hour, and 1600° C./1 hour. The phases of the calcined powders were examined by an x-ray powder diffractometer (XRG 3100 X-ray Generator, Phillips Electronic Instruments, Mahwah, N.J.). To study the transformations, a dilatometer (DIL) at a heating rate of 2.5° C./min. to 1550° C. and same cooling rate to 700° C. was employed. The pellet was cut into a rectangle with a 1mm thickness, 3 mm width, and 10 mm length.

5.2 Results

In the synthesis of the dysprosium monotitanate, a ratio of cations to moles of ethylene glycol of 1:3 was employed. Precipitates formed upon addition of the TISO to the dysprosium nitrate possibly due to the water contained in the nitrate and its reaction with air. Stirring the solution dissolved the precipitates. After some time, the solution turned very viscous and a gel resulted, likely due to the evaporation of the isopropyl alcohol. Upon heating, polymerization and pyrolysis occurred.

Simultaneous DTA/TGA of the powder precursor from room temperature to 1200° C. was taken. The temperature zones of decomposition were: (1) 100° C.–300° C., (2) 300° C.–400° C., (3) 400° C–600° C, (4) 600° C. –830° C. Beyond 830° C., the percent decomposition was less than 1%. Furthermore, at this point, the DTA curve exhibited an exothermic curve which is the crystallization temperature. The phases at the different calcined temperatures were identified using X-ray diffraction. The powder samples were calcined for 1 hour at temperatures of 830° C., 1000° C., and 1600° C. At 830° C., 1000° C., and 1600° C., the powder was cubic while at 1300° C., it was orthorhombic. The cubic powders had a brown yellowish color while the orthorhombic powder was brown. The pressed pellets were sintered to a temperature of 1600° C. with a heating and cooling rate of 5° C./min. XRD was also used to determine the crystal structure of the pellet, which was observed to be hexagonal.

The dilatometer was used to observe the change in dimensions of the sample as a function of temperature. The first derivative of the resulting graph gave the thermal expansion coefficient to be around $18 \times 10^{-6}$/K. The change in length was linear with temperature up to a region near 1440° C. At this point, the pellet shrank, probably due to sintering effects since the final temperature for the dilatometer run was 1550° C. which is near the sintering temperature. The sample by XRD after the dilatometer run gave a hexagonal structure.

5.3 Discussion

To determine the structure of the different calcination temperatures of the dysprosium titanate produced in accordance with the invention, XRD was used starting at 830° C. where the simultaneous DTA/TGA points to the crystallization point. At this temperature and at 1000° C., the crystal structure is cubic, however, the conventional phase diagram for this material does not mention a low temperature cubic form. This leads to a few interesting observations: (1) this cubic form is a metastable form or (2) the polymeric route gives a cubic structure at low temperatures. The powder calcined at 1300° C. is orthorhombic which concurs with the known phase diagram. The 1600° C. powder shows a cubic structure while the pellet shows a hexagonal structure. This might be due to the powder having very small hexagonal crystal sizes so it does not show up in the XRD. Owing to its properties, this powder may also be useful as a "transformation weakener" in structural ceramics such as high-temperature fiber-matrix composites (see, e.g. [20].)

In the dilatometry, $Dy_2TiO_5$ shows no hysteresis which is the defining mark of a phase transformation. The phase upon heating and cooling were the same. From the results of the dilatometry, it can be inferred that there are no first order transformations. However, second order transformations might still exist since the first derivatives are discontinuous at certain regions.

EXAMPLE 6

Preparation of Cristobalite Powder 6.1 Powder Preparation and Sintering Process

A clear sol was prepared from Ludox AS-40 Colloidal silica (40 wt % suspension in. water, Du Pont Chemicals, Wilmington, Del.); $Al(NO_3)_3 \cdot 9H_2O$ (reagent grade, Aldrich Chemical Co., Milwaukee, Wis.) and $Ca(NO_3)_2 \cdot 4H_2O$ (reagent grade, Aldrich Chemical Co., Milwaukee, Wis.) in proportions to form a final compositions of CaO:2 $Al_2O_3$:80 $SiO_2$[11,12]. After dissolving these reagents in DI water, the organic carrier, PVA solution, was added and the mixture was heated. The PVA solution was prepared from 5 wt % PVA (DP-1700) dissolved in water. The proportions of the PVA to cation sources in the solution were adjusted in such a way that there were 4 times more positively charged valences from the cations than the negatively charged functional groups of the organics. As the viscosity increased by evaporation of water, the mixture was vigorously stirred. The remaining water was then dried, converting the gel into a solid. Finally, the precursor was finely ground and calcined at 750° C. for 1 hour. The calcined powder was ball milled with zirconia media for 12 hours. Isopropyl alcohol was used as a solvent for milling. The ball-milled powder was uniaxially pressed at 20 MPa followed by iso-static pressing at 170 MPa for 10 min. The pellet-shaped green compacts were either pressureless sintered in an air atmosphere at 1350° C. for 1 hour or hot pressed at 1200° C. for 1 hour under 28 MPa pressure in an Ar atmosphere. In both cases furnace was cooled down to room temperature. After sintering, each sample was subjected to annealing at 1300° C. for various times. The stress-induced transformation was achieved by grinding the annealed specimens on #800 SiC paper.

6.2 Characterization (A) Thermal Analysis: The pyrolysis and decomposition behavior of crushed precursor was monitored by simultaneous differential scanning calorimetry and thermogravimetric analysis (DSC/TGA) (Model STA 409, Netzsch GmbH, Selb, Germany) up to 1200° C. at a heating rate of 10° C./min, in an air atmosphere.

(B) Particle Size Distribution Analyses: The particle size distribution of calcined or ball-milled powders were examined by a X-ray absorption spectrometer (Sedigraph Model 5000E, Micromeritics). The powders were suspended in a calibrated dispersion liquid. The suspensions were ultrasonicated for 3 min before analysis.

(C) Specific Surface Area Measurement: The specific surface area between the calcined powder and ball-milled powder was compared by nitrogen gas absorption (Model ASAP 2400, Micromeritics, Norcross, Ga.).

(D) Average Grain Size Measurement: Average grain size of sintered cristobalite after annealing was analyzed according to the Jeffries-Saltykov method.

(E) X-ray Diffraction Analysis: The phase change between α and β-cristobalite was studied as a function of heating temperature and annealing time by using a Rigaku spectrometer (Dmax automated powder diffractometer, Rigaku/USA, Danvers, Mass.) with CuKα radiation (40 kV, 40 mA). The relative ratios of α, β-cristobalite phases were determined by integrating the X-ray peak areas of (102) of α-cristobalite and (222) of β-cristobalite by the equation below, $$V_\alpha = [I(102)_\alpha / I(222)_\beta + I(102)_\alpha] \times 100$$

in which $V_\alpha$ is volume fraction of α-cristobalite, $I(102)_\alpha$ and $I(222)_\beta$ are peak intensity of $(102)_\alpha$ and $(222)_\beta$ respectively.

(F) Thermal Expansion Behavior: Thermal expansion behavior of sintered polycrystalline cristobalite samples were determined with a recording dilatometer (Netzsch Dilatometer, 402E, Germany) up to 1100° C. at a heating rate of 5° C./min.

(G) Electron Microscopy: The powder morphology and microstructure of sintered cristobalite were examined by Scanning Electron Microscopy, SE (ISI DS-130, International Scientific Instruments, Santa Clara, Calif.). To observe grain size and cracking, polished and annealed samples were chemically etched in boiling phosphoric acid for 30 sec. The grain morphology and selected are diffraction analysis were examined by Transmission Electron Microscopy, TEM (Philips EM-420, Philips Instruments, Inc., Mahwah, N.J.). The TEM specimens were prepared by standard ceramic polishing, dimpling and ion-milling techniques.

6.3 Results

The thermal analysis studies revealed that the precursor undergoes a three step weight loss process. The first weight loss was observed in the temperature until 170° C., which may be associated with loss of water and $NO_x$ compounds. A corresponding exotherm is observed in the DSC curve. The second major weight loss in TGA and a corresponding exotherm in the DSC curve occurred between 300° C. and 450° C. The weight loss above 300° C. was due to the removal of the carbon formed during decomposition and pyrolysis process. After two exothermic peaks, the weight loss diminished gradually until 650° C. There was no further weight loss after 700° C. A small exothermic peak, which is associated with crystallization, was detected at around 1050° C. The ball-milling process for making fine and homogeneous particle size was performed after calcination. The calcination temperature of 750° C. was determined in between 600° C., the highest temperature required for polymer burn-out, and 1050° C., the crystallization onset temperature. The particle size distribution was in the range from 80 μm to 5 μm and the particles were soft and irregular in shape, with sharp corners and edges. However, the ball-milled powder had a quite narrow particle size distribution with porous agglomerates and small particles of approximately 0.1–0.4 μm in size. The calcined powder had a BET specific surface area of 25m$^2$/g. The high specific surface area from the large particle size meant,that the calcined powder was very porous. The ball-milled powder had a specific surface area of 80m$^2$/g.

In the development of crystalline phases of the calcined powders at various heating temperatures, an amorphous phase was observed at 1000° C. Above 1100° C., the β-cristobalite crystalline phase was detected and complete β-cristobalite peaks were developed at 1200° C. With increasing temperature, the α-cristobalite phase increased gradually, while β-cristobalite decreased. At 1450° C., β-cristobalite still remained as a minor phase in the α-cristobalite matrix. Dilatometry curves for the stabilized cristobalite revealed that the α/β transformation occurred at 180° C. on heating and at 170° C. on cooling. The transformation temperature was lower than that of pure cristobalite because of the dopant effect. The thermal expansion coefficient of the β-cristobalite was approximately $1.5 \times 10^{-6}$/° C. and tended to decrease on heating. A change in thermal expansion coefficient was observed at the α/β transformation temperature. This change was much less for the polycrystalline cristobalite sintered at 1350° C. than the one at 1450° C. The difference in the change of thermal expansion coefficient was attributed to the α-cristobalite content. In case of the polycrystalline cristobalite sintered at 1350° C., the α-cristobalite was the matrix phase.

The formation of α-cristobalite on cooling was affected by grain size. Spontaneous transformation from β phase to α a phase occurred at larger grain size. In contrast, a small β-cristobalite grain size stabilized the β phase. The grain size of the stabilized β-cristobalite was controlled by annealing time. In a plot of integrated X-ray peak intensity ratios of $I(102)_\alpha/I(222)_\beta+I(102)_\alpha$ and average grain sizes for hot-pressed or pressureless-sintered samples as a function of annealing time, it was impossible to compare the intensity of the (111) and (220) peaks from β-cristobalite and (101) and (200) peaks from α-cristobalite, which are the high intensity peaks of cristobalite system, because the peaks are located at almost the same 2θ value. Therefore, the relative amount of α and β-cristobalite phase was compared from the intensity of $(102)_\alpha$ and $(222)_\beta$ peaks.

In general, ratios of α/β-cristobalite phases and the average grain size showed an increase with increasing annealing time. The ratio of α/β X-ray peak intensity and average grain size for pressureless-sintered sample increased very gradually for annealing times over 30 h. The average grain sizes and the ratios of α/β X-ray peak intensity at 30 h and 50 h annealing times were about 5 μm, 60 vol %, and 5.6 μm, 63 vol %, respectively. In the case of the hot-pressed sample, grain growth occurred at a faster rate than in the pressureless-sintered sample during the first 12 h of annealing time. The rate of grain growth decreased gradually from 12 hours annealing time onwards. In contrast to the pressureless-sintered sample, the ratio α/β of X-ray peak intensity and grain growth increased until the annealing time of 50 hours. Large grain sized of about 8.5 μm at annealing time of 50 hours resulted in fragile samples having extensive cracks. This was because the thermally-induced transformation occurred spontaneously due to the critical size effect. The sample annealed for 50 hours showed almost 80 Vol % α-cristobalite. Thick and extensive cracks rather than fine microcracks were observed in a cristobalite sample which was hot-pressed and annealed for 50 hours. In observing polished surface micrographs of cristobalite annealed at various times, it was observed that the microstructure of pressureless-sintered sample annealed for 12 hours was not dense, with an average particle size of 3 μm. Longer annealing times (30 hours) increased the average grain size to about 5 μm. However, the grain growth occurred non-homogeneously. Some small grains coexisted with large grains of over 5 μm size even after long annealing times of 30 hours. The coarse microstructure having a lot of macropores showed a very gradual increase in the ratio of α/β X-ray peak intensity. This was because the large grains increased in size with increasing annealing time, while the small size grains, in contrast, did not grow despite long annealing times. About 40 vol % β-cristobalite existed in the matrix after annealing of 30 hours. It was seen that some cracking was induced by the thermally induced transformation which occurred spontaneously in the large grain size. The hot-pressed and un-annealed sample had a smaller grain size and denser microstructure than pressureless-sintered sample. Hence, the grain growth occurred at a faster rate and was more homogeneous than in the pressureless-sintered sample. This is attributed to easier mass transportation through the dense microstructure during the annealing process. This resulted in an increase in the ratio of α/β X-ray peak intensity up to 50 hours annealing time, in contrast to the pressureless-sintered sample. Some cracks were detected in the microstructure having an average grains size of about 5 μm, at an annealing time of 12 hours. The hot-pressed cristobalite annealed for 30 hours consisted of about 72% cristobalite. It also had cracks in the microstructure with an average grain size of 7 μm.

The transformation of β to α cristobalite was susceptible to the influence of stress. Shear-stress-induced β to α cristobalite conversion for annealed and ground specimens at various annealing times were compared. The amount of stress-induced α phase increased with increasing annealing time. In the case of pressureless-sintered cristobalite, the ratio of α/β X-ray peak intensity of ground specimens was slightly higher than the annealed specimens. About 7 vol % α-cristobalite was increased by the stress-induced transformation after annealing for 20 hours. In comparison, the hot-pressed specimens were more sensitive to shear stress. An increase of about 13 vol % α-cristobalite was calculated at 12 hours of annealing time. In contrast to pressureless-sintered specimens, the increase in the amount of α-cristobalite in the ground specimens over that in the only annealed specimens, decreased with increasing annealing time above 12 hours. This is because the amount of β-cristobalite, which can be transformed by stress, was decreased by the thermally-induced transformation which occurred in the over-sized grains.

Transmission electron microscopy studies confirmed the critical size effect on the phase transformation of cristobalite. In studying TEM bright-field α, β-cristobalite grains and corresponding SAD patterns of the hot-pressed and annealed samples, a cubic β-cristobalite pattern was noted in the un-annealed specimen. The specimen annealed for 12 hours showed a tetragonal α-crsitobalite pattern in the grain which has a size of about 5 μm and above.

6.4 Discussion

The solution-polymerization route employing PVA solution was quite effective in achieving a fine powder for chemically stabilized cristobalite. The soft and porous powder obtained after calcination at 750° C. made it easier to get a fine powder on further ball-milling the powder. The powder calcined above 900° C. started becoming harder and denser. This was because the powder after polymer burn-out was active enough to be densified at that temperature. If during the calcination process, powder densification was initiated, then the powder could not be ball-milled to a fine particle size. The particle size distribution was also quite narrow in this method. However, in the case of the pressureless-sintered specimen, uniform grain growth did not occur because of the presence of pores between grains. The non-uniform grain growth resulted in only localized phase transformation. This fact was demonstrated in that about 40 vol % α-cristobalite was retained even after 30 hours of annealing. This was because the smaller grains were not affected by thermal-induced transformation. X-ray analysis of calcined powder heated at 1450° C. still showed β-phase, despite the use of high enough temperatures to cause thermal-induced transformation. This is also attributed to the presence of particles too small to be transformed. Hot-pressing was very effective in controlling the porosity and a relatively uniform grain growth was possible during the annealing process.

Internal cracks were formed due to thermally-induced transformation, which spontaneously occurred on cooling, and were developed from an average grain size of 5 μm. Shear-stress induced transformation also depended upon the grain size. However, the pressureless-sintered cristobalite displayed less dependence on the grain size because of non-uniform grain growth resulting in a coarse microstructure. In order to use the chemically-stabilized β-cristobalite for a transformation-weakening mechanism, more extensive shear-stress-induced transformation is required. For that, a homogeneous microstructure having a grain size of 4–5 μm is desirable. The critical size of 4 μm is a little smaller than the grain size of 5 μm at which cracks due to thermally-induced transformation occurred spontaneously.

EXAMPLE 7

Preparation of Barium Titanate and Barium Orthotitanate 7.1 Powder Preparation

Barium nitrite ($Ba(NO_2)_2 \cdot H_2O$, reagent grade, Alfa Aesar Chem. Co., Ward Hill, Mass.) and titanium (IV) isopropoxide ($Ti(OC_3H_7)_4$, reagent grade, Alfa Aesar Chem. Co., Ward Hill, Mass.) were dissolved in stoichiometric proportions in liquid-type ethylene glycol (Fisher Chemical, FW: 62.07, Fair Lawn, N.J.). The amount of ethylene glycol was calculated using a ratio of total weight of metal ions from cation sources to weight of ethylene glycol. Several ratios (1:1, 1:3, 1:5 and 1:7) were tried. The barium nitrite was first added to the ethylene glycol and heated to 80° C., while mixing, until it was fully dissolved. Then, the titanium (IV) isopropoxide was slowly added, while stirring. The solution was then allowed to gel for 48 h in a drying oven at 50° C. The dried gel was then calcined on a zirconia (3Y-TZP) substrate, in a box furnace, at various temperatures. The calcined barium orthotitanate powders were kept in a dessicator under vacuum to prevent reaction with air.

The stabilization of the high temperature phase of $Ba_2TiO_4$ was investigated using 3, 6 and 10 wt % of MgO. The stabilizer was added to the sol in the form of magnesium nitrate hexahydrate ($Mg(NO_3)_2 \cdot 6H_2O$, reagent grade, Aldrich Chemical, Milwaukee Wis.). In the case of barium titanate, the calcined powder was ball-milled with zirconia media for 12 h. Isopropyl alcohol was used as a solvent for milling. The ball-milled $BaTiO_3$ powders and as-calcined $Ba_2TiO_4$ powders were uniaxially pressed at 20 MPa followed by iso-static pressing at 170 MPa for 10 min. The pellet-shaped green compacts of barium titanate and barium orthotitanate were sintered at 1200° C. for 2 h in an air atmosphere.

7.2 Powder Characterization

The crystallization behavior of the gel-type powders was examined as functions of calcining temperature and holding time, using a X-ray diffractometer (Rigaku/USA, Dmax, automated powder diffractometer, Danvers, Mass.) with $CuK_\alpha$ radiation (40 kV, 40 mA). The morphology of the crystallized powders and grains after sintering were examined by scanning electron microscopy, (SEM, Hitachi S530, Hitachi, Japan). The specimens were mounted on an aluminum stub and Au—Pd sputtered. To observe the grain size of sintered barium titanate, a cross section was polished and then thermally etched at 1100° C. for 10 min. The thermal expansion behavior at the phase transformation of sintered barium orthotitanate samples was determined with a recording dilatometer (Netzsch Dilatometer, 402E, Germany) and DSC up to 1200° C., at a heating rate of 5° C./min. The dielectric constant of the sintered barium titanate pellet was characterized with a HP4275A impedance analyser operated at room temperature.

7.3 Results (A) Barium Titanate

Figure 20A:
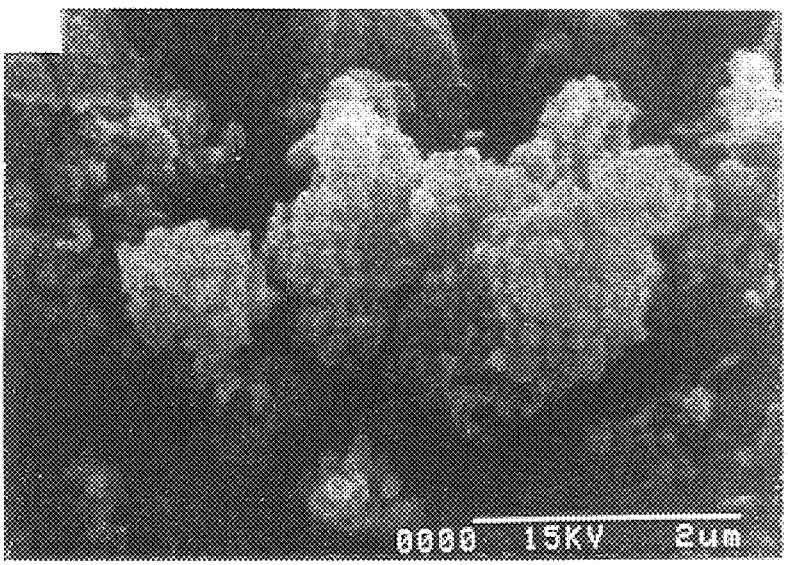
FIG. 20 shows a scanned image of an SEM micrograph of barium titanate powders prepared using ethylene glycol in metal cation to glycol weight ratios of 1:3 (20*a*); 1:5 (20*b*); and 1:7 (20*c*).
Figure 20B:
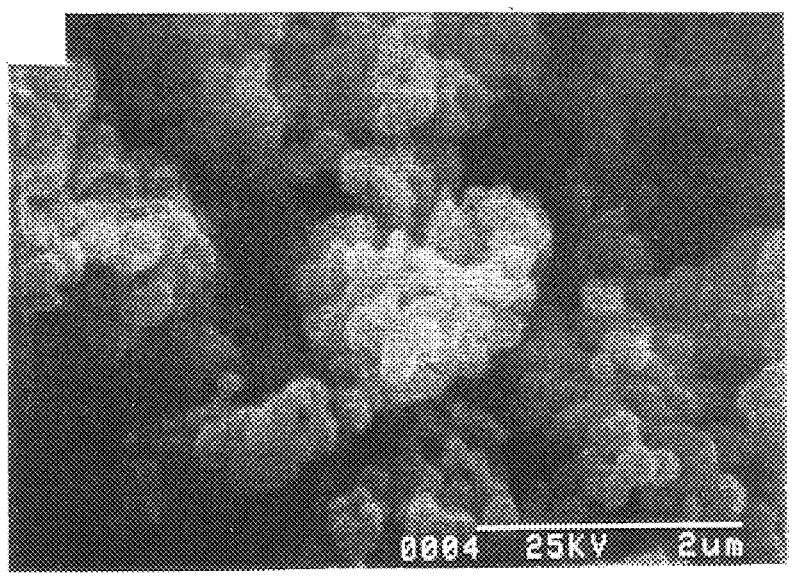
Figure 20C:
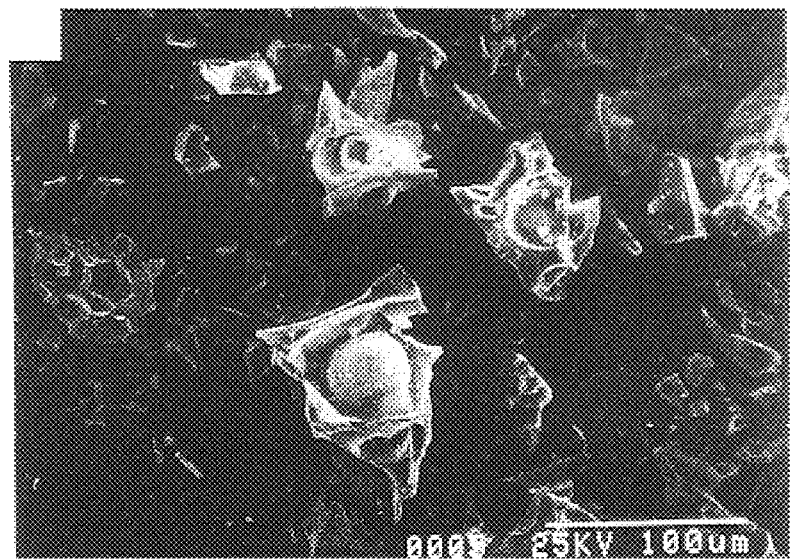

The metal ion sources (barium nitrite and titanium (IV) isopropoxide) were dissolved in ethylene glycol after heating to 80° C. However, in the case of the solution which had the 1:1 ratio, some precipitation occurred, despite long stirring times. The amount of ethylene glycol was not enough to dissolve the cation sources without any solvent media. Table III lists the XRD results and particle sizes of the crystallized powders after calcination at each temperature for 1:3, 1:5 and 1:7 ratios. The powder derived from the 1:3 ratio crystallized to tetragonal $BaTiO_3$ at the lowest temperature of 700° C. after 1 h. The other precursors required higher calcining temperatures to crystallize. FIG. 20 shows the SEM morphologies of crystallized powders calcined at their lowest crystallization temperatures. The SEM micrograph of the powder prepared from the 1:3 ratio sol revealed nanosized particles of about 100 nm in size, with a narrow particle size distribution. The powder derived from the 1:5 solution resulted in a larger particle size of approximately 200 nm. This was attributed to higher activation energies for particle size growth at the higher crystallization temperatures. The morphology of the powder made by the 1:7 solution consisted of broken spheres and had a wide particle size distribution. The excess polymer caused inhomogeneity in the precursor due to entanglements of the polymer chains. This resulted in serious agglomeration, large particle sizes and a wide particle size distribution. In the case of the 1:7 ratio powder, 1250° C. was needed for full crystallization, due to the inhomogeneity in the system. The broken sphere morphology was produced by trapped gases, such as CO and $CO_2$ that expanded when heated, and fractured the spherical shapes.

TABLE III

Phase development of barium titanate powders at various calcination temperatures and average particle size corresponding to each lowest crystallization temperature.

| Mixing ratio | 700° C. | 900° C. | 1250° C. | Particle Size nm size (nm) |
|---|---|---|---|---|
| 1:3 | Tetragonal | Tetragonal | Tetragonal | 70–150 |
| 1:5 | Amorphous | Tetragonal | Tetragonal | 150–250 |
| 1:7 | Amorphous | Amorphous | Tetragonal | Irregular |

The resulting pellet had a 97% relative density and a grain size of about 200 nm after sintering at 1200° C. for 2 h. The densification temperature was notably lower than reported to date. The dielectric constant for the disc-type, sintered $BaTiO_3$ reached 2,100 at room temperature.

(B) Barium Orthotitanate

The $Ba_2TiO_4$ was found to decompose when exposed to air at ambient temperatures. Hence, the calcined powder was kept in a dessicator under vacuum. The $Ba_2TiO_4$ precursor powders formed the best crystallinity with a 1:5 ratio solution. The powder derived from the 1:5 ratio solution crystallized at lower temperatures than did the powder produced from 1:7 ratio solution. The phase changes of $Ba_2TiO_4$ powders at various temperatures are summarized in Table IV. The powder produced from 1:5 ratio solution crystallized to monoclinic phase after heating at 1000° C. for 5 h or at 1200° C. for 1 h. During calcining, tetragonal barium titanate (t-$BaTiO_3$) formed prior to the appearance of monoclinic barium orthotitanate (m-$Ba_2TiO_4$)

TABLE IV

Phase change of barium orthotitanate powders at each calcination temperature (EG content; 1:3).

| Calcination Temp. (° C.) | 800 | | 1000 | | 1200 | | 1400 | |
|---|---|---|---|---|---|---|---|---|
| Holding Time (h) | 1 | 5 | 1 | 5 | 1 | 5 | 1 | 5 |
| Phase | T | T | T + M | M | M | M | M + G | M < G |

T: Tetragonal barium titanate (t-$BaTiO_3$)
M: Monoclinic barium orthotitanate (m-$Ba_2TiO_4$)
G: Glass The SEM micrograph of the m-$Ba_2TiO_4$ (from 1:5 ratio solution) calcined at 1200° C. for 1 h. revealed an average particle size of ~0.6 $\mu$m, as well as presintered particles with glassy phase.

Comparison of Tables IV and V implies that the addition of MgO can make $Ba_2TiO_4$ phase more chemically stable by inhibition of BaO release.

EXAMPLE 8

Preparation of Dicalcium Silicate, Tricalcium Silicate Tricalcium Aluminate and Tetracalcium Aluminate Iron Oxide The four components of Portland cement: dicalcium silicate, $C_2S$ ($Ca_2SiO_4$), tricalcium silicate, $C_3S$ ($Ca_3SiO_5$), tricalcium aluminate, $C_3A$ ($Ca_3Al_2O_6$), and tetracalcium aluminate iron oxide, $C_4AF$ ($Ca_4Al_2Fe_3O_{10}$), were formed using a solution-polymerization route based on polyvinyl alcohol (PVA) as the polymer carrier.

8.1 Powder Preparation

The nitrate salts were in the form of cation sources With the exception of silica which was supplied as a colloidal silica product (Ludox SK, 25% silica sol, DuPont, Wilmington, Del.). The chemical reagents and product manufacturers are listed in Table VI. These cation sources were dissolved in stoichiometric proportions in de-ionized (DI) water. To improve the process of dissolving the Ludox SK, the pH of the solution was adjusted by addition of nitric acid. Once the cation sources were completely dissolved, the 5 wt % PVA (Air Products and Chemicals, Inc., Airvol Series, Allentown, Pa.) was dissolved in DI water and added. The degree of polymerization (D.P.) of the PVA was varied in these experiments. The high D.P. PVA was made from Airvol 540S, with a D.P. value of 1625 (monomers/polymer), and the low D.P. PVA was made with Airvol 205S with a D.P. of 428 (monomers/polymer). The high D.P. PVA had a molecular weight of 153,000 and the low D.P. PVA had a molecular weight of 40,000. The proportions of the PVA

TABLE V

Phase changes of stabilized barium orthotitanate with different MgO content after several annealing conditions.

| Annealing Temp (° C.) | 800 | 1000 | | | 1100 | 1200 | 1300 | 1500 |
|---|---|---|---|---|---|---|---|---|
| Annealing Time (h) | 2 | 2 | 6 | 50 | 5 | 15 | 2 | 5 |
| 3 wt % MgO | M + T | M + T | O + M + T | O < T | O + T | O < T | O + H | Melt |
| 6 wt % MgO | M + T | O | O > T | O + T | O > T | O > T | O > H | O < H |
| 10 wt % MgO | O + T | O | O | O > T | O | O > T | O > H | O > H |

O Orthorhombic barium orthotitanate (o-$Ba_2TiO_4$)
M Monoclinic barium orthotitanate (m-$Ba_2TiO_4$)
T Tetragonal barium titanate (t-$BaTiO_3$)
H Hexagonal barium titanate (h-$BaTiO_3$)

By the addition of 6 and 10 wt % MgO, the high temperature orthorhombic phase was obtained at room temperature. With only a 3 wt %. MgO addition, pure orthorhombic phase was not obtained at all temperature ranges. Above 1500° C. the 3 wt % stabilized powder would. begin to melt. In the 6 and 10 wt % MgO stabilized powders, t-$BaTiO_3$ phase was detected after long annealing times at 1000° C. It was reported (21) that for $BaTiO_3$ and $Ba_2TiO_4$ the ratio of the number of oxygen atoms to barium atoms is not sufficient to allow a close packed framework. Particularly, the effect was much more important in $Ba_2TiO_4$ than in $BaTiO_3$. (21) In $Ba_2TiO_4$, the Ti—O bond became the predominant factor which produced a tetrahedral environment around titanium, and the result was a loosely packed structure of barium atoms. This implies that BaO is easily released from the unstable $Ba_2TiO_4$, resulting in the formation of stable $BaTiO_3$.

The orthorhombic phase was more stable in the 10 wt % MgO, as compared to 6 wt % MgO stabilized powder.

to cation sources in the solution were adjusted in such a way that there were 4, 8, or 12 times more positively charged valences from the cations than from the potentially negatively charged –(OH) functional groups of the polymers. The polymeric long chains have hydroxyl groups in solution. Hence, one PVA monomer, which has one hydroxyl (OH) functional group, can be used as an unit for calculation of PVA content. In this experiment, the effect of PVA content and its degree of polymerization on powder preparation is studied. Therefore, the exact relative amount of PVA to cations in the solution can be calculated with reference to a monomeric unit of PVA. For example, in the case of the 4:1 PVA ratio in $C_2S$, the total positively charged valences are eight. Thus, two PVA monomers were used per one $C_2S$ molecule. Water was evaporated by continuous stirring during heating on a hot plate. The resulting gel-type precursor was completely dried after several hours at 100° C. The organic/inorganic precursors were then ground and kept in a dessicator because of their hydrophilic characteristics.

Each of the ground precursors were calcined or crystallized at various temperatures in an air atmosphere in a box furnace. Each of the four components were calcined at a heating rate of 3° C./min. Crystallized $C_3S$ and $C_3A$ powders were milled using an attritor mill (Szegvari Attritor System Type B, Union Process, Akron, Ohio) to examine the effects of milling on the surface area. The powders were attritor milled at 240 rpms for 1 hour. Approximately 700 g of zirconia milling media of diameter 5 mm were mixed with 100 ml of methyl alcohol in a 600 ml jar.

8.2 Powder Characterization (A) X-ray Diffraction Analysis: The crystallization behavior of each of the calcined powders was studied as a function of temperature and holding time at elevated temperatures, using a Rigaku X-ray diffractometer (Dmax automated powder diffractometer, Rigaku/USA, Danvers, Mass.) with CuKα radiation (40 kV, 40 mA). All XRD data was obtained at room temperature, after the powder had been cooled. A scanning speed of 10°/min with a sampling interval of 0.02° over a range of 10–70° for $C_2S$, $C_3S$, and $C_3A$ was used. For $C_4AF$ the range varied from 30–40°.

In $C_3A$, the relative volume ratios of $C_3AO$ and residual CaO phases were determined by integrating the X-ray peak areas of (440) of $C_3A$ and (200) of CaO using the equation:

$$V_{C3A}=[I(440)_{C3A}/(I(200)_{CaO}+I(440)_{C3A}]\times 100$$

in which, $V_{C3A}$ is the volume fraction of $C_3A$, and $I(440)_{C3A}$ and $I(200)_{CaO}$ are the 100% peak intensities of $C_3A$ and CaO, respectively.

(B) Specific Surface Area Measurement: The specific surface area of the crystallized powders and attrition milled powders were obtained by five-point BET analysis from nitrogen gas adsorption (Model ASAP 2400, Micromeritics, Norcross, Ga.). All samples for testing were kept in a dry oven to prevent hydration of the powders.

(C) Microstructure Characterization: The morphologies of calcined, crystallized, and/or attrition-milled powders were examined by scanning electron microscopy, SEM (Model Hitachi S530, Hitachi, Japan). For the SEM specimens, each powder was completely dried, attached to an aluminum stub, and gold sputter coated.

8.3. Results and Discussion

The optimum pH's for $C_2S$ and $C_3S$ to form transparent solutions and stoichiometric powders are listed in Table VI shown in FIG. 13. For each of the four components, the binder was completely burned out by 700° C. With respect to the characteristics of the dried precursors, both $C_3A$ and $C_4AF$ resembled an aerogel formed by foaming during the stirring and solution drying process. The foam mainly resulted from elimination of $NO_x$ gases from the aluminum nitrate source.

(A) Crystallization Behavior

Tables VII and VIII, shown in FIGS. 14 and 15, respectively, summarize the X-ray diffraction data acquired for each of the four powders, for high and low D.P. PVA, respectively. The effect of D.P. was particularly evident in the 700° C. calcining range for $C_2S$ and $C_3S$. In the high D.P. route, the amorphous phase was still present while with the low D.P. PVA, the calcined powders were crystallized. In the case of single phase $C_3A$ (>95 vol %), the powder prepared via low D.P. PVA crystallized at 1000° C./1 h. In comparison, 1100° C./3 h conditions were necessary to crystallize relatively pure $C_3A$ made by the high D.P. PVA. $C_4AF$ showed no apparent changes in its crystalline behavior.

The effect of degree of polymerization of the PVA may be attributed to the following considerations. The low D.P. PVA had smaller polymer chain lengths than did the high D.P. PVA, so it could make the range of distances between cations in the solution shorter. This is especially important in the synthesis of $C_3A$ and $C_3S$ because the concentration of $Ca^{2+}$ ions is much higher than of $Al^{3+}$ or $Si^{4+}$ ions, respectively. This can lead to unreacted CaO phase at even high temperatures. For the compound to be synthesized at low temperatures, the $Ca^{2+}$ ions and $Al^{3+}$ or $Si^{4+}$ ions must be homogeneously dispersed within a short range of each other to promote reaction, rather than having a long range distribution. The chain length of the lower D.P. PVA was small enough for this mixing to occur in the steric entrapment mechanism. Furthermore, the higher amount of PVA (4:1 ratio) added to the solution aided in this mixing process. The low D.P. PVA distributed the metal ions homogeneously, so that after binder burnout, the network shrank, enabling $C_3A$ or $C_3S$ to be formed more readily. The cations were sterically entrapped, within short range of each other and formed organic precursor complexes. Thus, it did not require as high a temperature to form the compound.

Figure 16:
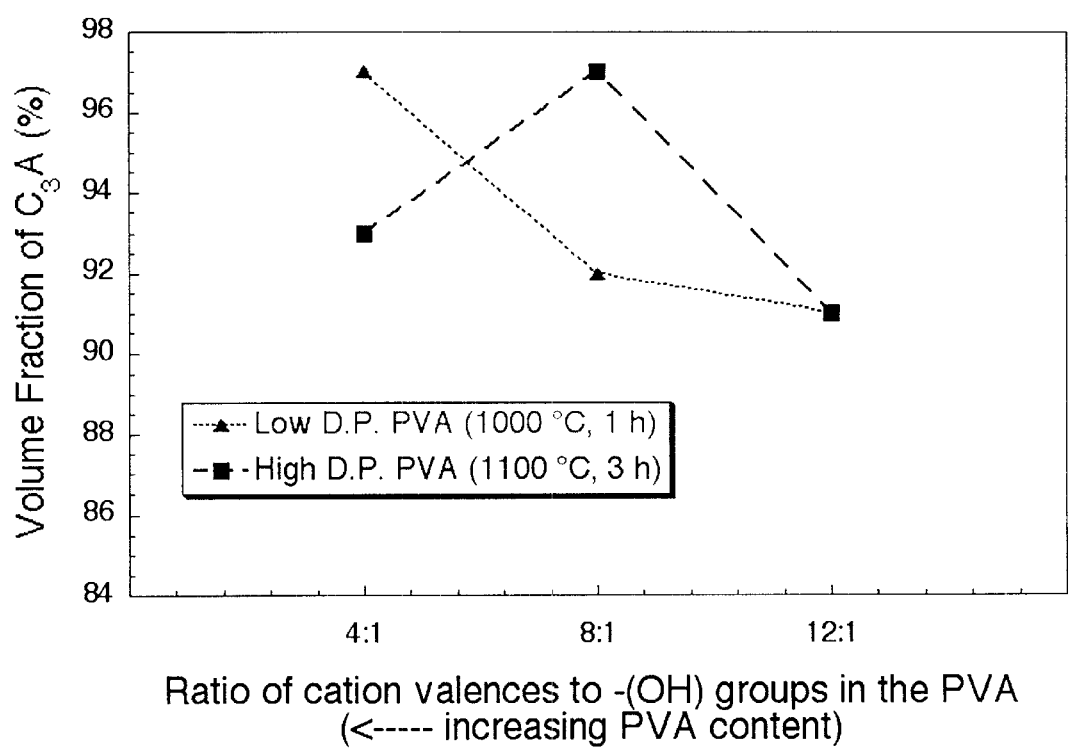
FIG. 16 a graph illustrating the effect of PVA content on the crystallization of tricalcium aluminate.

FIG. 16 shows the effect of the PVA content on the crystallization of $C_3A$. The volume fraction of $C_3A$ was determined by comparing the ratio of the integrated area of the 100% intensity peak for CaO with the 100% intensity peak for $C_3A$. In the low D.P. PVA process the volume fraction of $C_3A$ increased with the increasing PVA. The best result was obtained with the low D.P. PVA in the 4:1 ratio. This implies that in the low D.P. PVA system, the higher content of PVA did not make a significant difference in the distance between cations, but rather it improved the homogeneity of the distribution of cations. In the high D.P. PVA system, the 8:1 ratio showed the highest volume fraction of $C_3A$. This may be attributed to the high D.P. PVA chain lengths being longer than the low D.P. PVA, so that in the 4:1 case the cations could not get close enough to one another to form a compound. The solution had a high viscosity with inhomogeneities caused by the entanglements of the long-chain PVA molecules in excess amount. Once this ratio was changed to 8:1, the results improved dramatically because the metal ions could get close enough to one another to form $C_3A$. Because PVA is not an expensive chemical, it may be more economical overall to use more PVA in conjunction with the lower D.P. PVA, so as to achieve the best result possible, rather than calcining at 100° C. higher and for 2 hours longer by using the high D.P. PVA. The 12:1 case is the most undesirable for both the low and high D.P. PVA because there simply was not a high enough PVA content to make a homogenous mixture. Agglomeration can also occur at the 12:1 PVA ratio, and hence the specific surface area was decreased.

(B) BET Specific Surface Area

Table IX, shown in FIG. 17, summarizes the BET specific surface area of each powder at the optimum crystallization conditions which had the lowest crystallization temperature. Except in the case of $C_3S$, the surface area increased with the use of the low D.P. PVA. This may be attributed to lower crystallization and hence decreased sintering between particles. The higher the specific surface area, the faster the hydration, which decreases the setting time in cements. Attrition milling for 1 h can also dramatically increase the specific surface area, because of the breaking up of the pre-sintered, coarse powder agglomerates. By attrition milling, an extra step has been added to the formation of these high specific surface area powders, as well as an extra expense. However, after only one hour of milling, the surface area was increased by more than 50 times in the case of $C_3S$ and by more than 4 times for $C_3A$. $C_3S$ is known for its ability to hydrate rapidly, to be responsible for the initial set, and to provide early strength to Portland cement. These characteristics are important because $C_3S$ typically makes up more than 50% of the material. Therefore, with a specific surface area of 50 m²/g, the setting time can be decreased by an even greater amount because it will hydrate faster, while providing the same strength to the cement.

Figure 18:
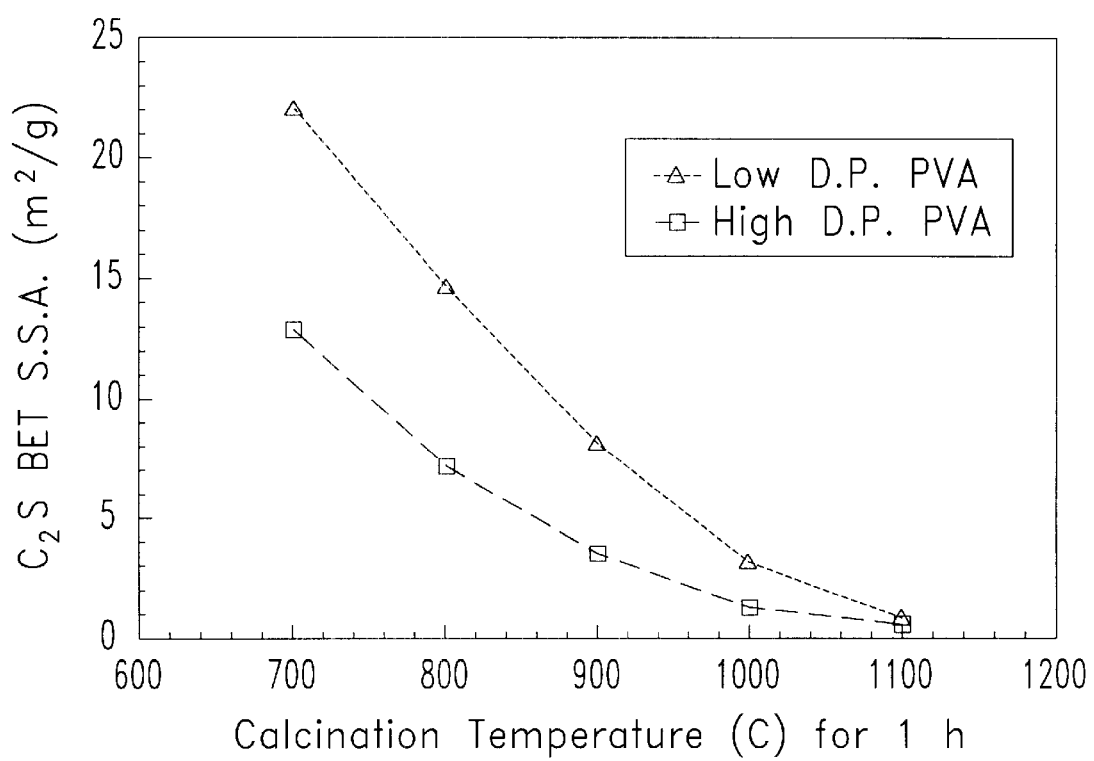
FIG. 18 shows a graph illustrating the relationship between the specific surface area and the calcination temperature for dicalcium silicate.

A comparison was made between the low and high D.P. PVA, with reference to how the surface area changed with temperature increases. FIG. 18 illustrates this behavior for $C_2S$ as a representative case study for each of the components of Portland cement. It shows that as the calcining temperature increases, the specific surface area decreases. This occurred in the powders made by both the low and high D.P. PVA methods. The powder made with the low D.P. PVA exhibited a more negative slope than did the high D.P. PVA powder. This implies that the powder made by the low D.P. PVA method should have enhanced reactivity, finer particle size, and faster sintering.

Figure 19:
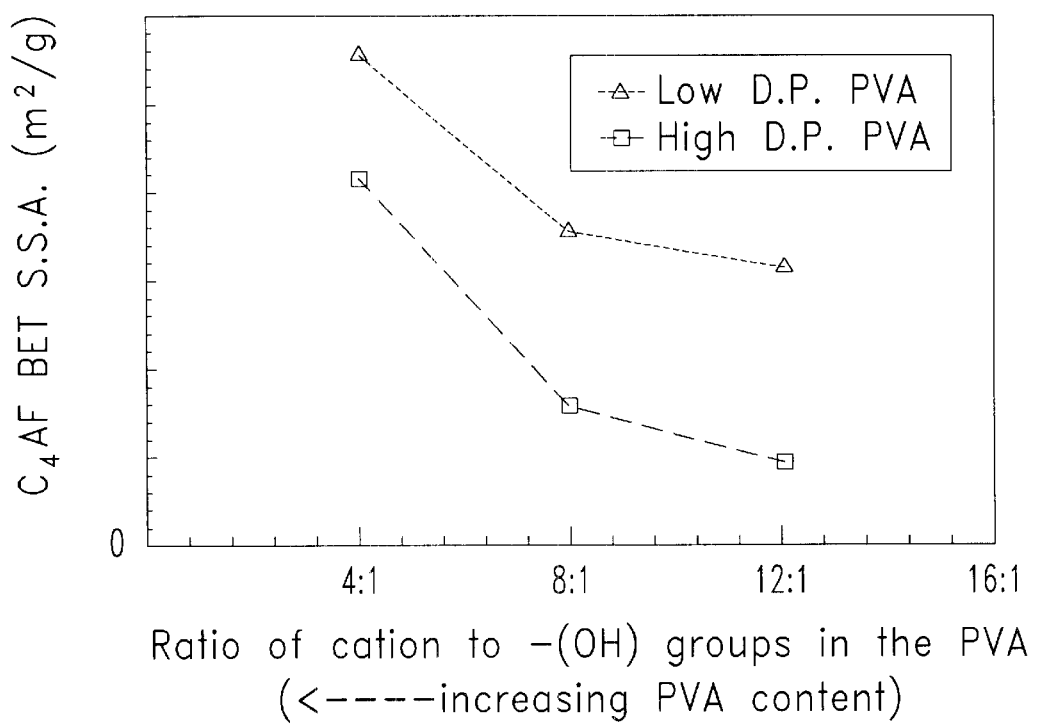
FIG. 19 shows a graph illustrating the relationship between the specific surface area and the PVA content for tetracalcium aluminate iron oxide.

FIG. 19 shows the effect of the PVA content on the BET specific surface area. This experiment was conducted with $C_4AF$ calcined at 700° C., with both the low D.P. and high D.P. PVA solutions. The data remained consistent with the results from FIG. 18, in that the low D.P. PVA produced powders with higher surface areas. Furthermore, FIG. 19 illustrates that the more PVA used, the higher the surface areas in both the powders made from the low and high D.P. PVA. For systems in which not enough polymer is used, agglomeration may occur. One explanation for this may be that upon burnout, the agglomerated cation precursors lose most of the organics in the outer region. Due to the intense heat evolved from the oxidative process, organic components remain within the shell. Further application of heat causes the organics to decompose into gases and expand. The less-agglomerated particles have lost most or all of the organics with the application of heat. In the case of agglomeration, during the slow decomposition of organics, the agglomerated cations are oxidized. Thus, a large powder particle size distribution is observed. To maximize the powder properties, therefore a balance is needed between cations and the amount of polymer.

(C) Powder Morphology

In the powders prepared by the high D.P. PVA method particle necking resulting from sintering was observed except in the $C_4AF$ powder which crystallized at low temperatures. The pre-sintering resulted from the exceedingly high specific surface area and hence enhanced reactivity of the $C_3A$ and $C_3S$ powders, which needed a relatively high crystallization temperature to completely react all the CaO. The $C_4AF$ powder showed a particle size distribution in the range from 50 nm to 400 nm.

In general, the powders derived from the low D.P. PVA were more reactive than were the powders prepared from the high D.P. P.VA. For example, in the case of $C_3A$, the microstructure was more dense with smaller individual particle sizes in comparison with the $C_3A$ derived from the high D.P PVA, despite a lower crystallization temperature for the low D.P. PVA method. This suggests that the low D.P. PVA method is more effective in making fine and reactive powders than the high D.P. PVA method. $C_3S$ prepared from the low D.P. PVA showed the same tendency as did the $C_3A$ powder. The $C_2S$ powder in the low D.P. PVA route was crystallized before the onset of sintering. It was possible to retain a small particle size ($\approx$100 nm) without particle necking at its low crystallization temperature of 700° C. Agglomerates of approximately 1.5 $\mu$m in size were observed. $C_4AF$ powder derived from the low D.P. PVA process exhibited nearly the same result as that obtained from the high D.P. PVA system.

Before attrition-milling, $C_3S$ and $C_3A$ powders showed quite a dense morphology because of sintering. However, attritor milling for 1 h was effective in breaking up the porous necked particles. This was clearly demonstrated for the $C_3S$ and $C_3A$ powders. In both cases, attritor milling resulted in significant increases in specific surface area (Table IX) and hence reactivity.

REFERENCES

The following references are indicative of the level of skill possessed by those working in the art and are hereby incorporated by reference, as if each had been individually incorporated by reference and fully set forth.

1. N. G. Eror and H. U. Anderson, "Polymeric Synthesis Of Ceramic Materials", Mater. Res. Soc. Symp. Proc., Vol. 73, p. 571, Materials Research Society, Pittsburgh, Pa. (1986).
2. M. Pechini, "Method of Preparing Lead And Alkaline-Earth Titanates And Niobates And Coating Method Using The Same To Form A Capacitor", U.S. Pat. No. 3,330,697, Jul. 11, 1967.
3. D. Budd and D. A. Payne, "Preparation Of Strontium Titanate Ceramics And Internal Boundary Layer Capacitors By The Pechini Method", Mater. Res. Soc. Symp. Proc., Vol. 32, p. 239 (1984).
4. I. Nettleship, J. L. Shull, Jr., and W. M. Kriven, "Chemical Preparation and Phase Stability Of $Ca_2SiO_4$ And $S4_2SiO_4$ Powders", J. Euro. Ceram. Soc., Vol. 11, pp. 291–298 (1993).
5. L-W Tai and P. A. Lessing, "Modified Resin-Intermediate Processing Of Perovskite Powders: Part I. Optimization Of Polymeric Precursors", J. Mater. Res., Vol. 7, No. 2, pp 502–510 (1992).
6. L-W Tai and P. A. Lessing, "Modified Resin-Intermediate Processing Of Perovskite Powders: Part II. Processing For Fine, Nonagglomerated Sr-Doped Lanthanum Chromite Powders", J. Mater. Res., Vol. 7, No. 2, pp. 511–519 (1992).
7. S. C. Zhang, G. L. Messing, W. Huebner and M. M. Coleman, "Synthesis of $YBa_2Cu_3O_{7-x}$ Fibers From An Organic Acid", J. Mater. Res., Vol. 5, No. 9, pp. 1806–1812 (1990).
8. P. A. Lessing, "Mixed-Cation Oxide Powders Via Polymeric Precursors", Am. Ceram. Soc. Bull., Vol. 68, No. 5, pp. 1002–1007 (1989).
9. L-W Tai, H. U. Anderson, and P. A. Lessing, "Mixed-Cation Oxide Powders Via Resin Intermediates Derived From A Water Soluble Polymer", J. Am. Ceram. Soc., Vol. 75, No. 12, pp. 3490–3494 (1992).
10. H. U. Anderson, M. J. Pennell and J. P. Guha, "Polymeric Synthesis Of Lead Magnesium Niobate Powders", in Advances In Ceramics, Vol. 21: Ceramic Powders Science, Am. Ceram. Soc., p. 91, Westville, Ohio (1987).
11. M. A. Gulgun, O. O. Popoola and W. M. Kriven, "Chemical Synthesis And Characterization Of Calcium Aluminate Powders", J. Am. Ceram. Soc., Vol. 77, No. 2, pp. 531–539 (1994).
12. X. Cong and R. J. Kirkpatrick, "Hydration Of Calcium Aluminate Cements: A Solid-State $^{27}AlNMR$ Study", J. Am. Ceram. Soc., Vol. 76, No. 2, pp. 409–416 (1993).
13. V. I. Yakerson, V. D. Nissenbaum, E. Z. Golosman, and V. M. Mastikhin, "High Resolution NMR Study Of Calcium Aluminate Catalysts", translated from Kinetika i Kataliz, Vol. 27, No. 6, pp. 1419–1426 (1986).
14. M. A. Gulgun and W. M. Kriven, "A Simple Solution Polymerization Route for Oxide Powder Synthesis," Ceramic Transactions, 62, 57–66 (1996).
15. M. A. Gulgun, Ph.D. Dissertation, Supplement, University of Illinois at Urbana-Champaign, 1996.
16. X. Cong and R. J. Kirkpatrick, "Hydration of Calcium Aluminate Cements: A Solid-State $^{27}Al$ NMR Study," J. Am. Ceram. Soc., 76 [2] 409–416 (1993).
17. V. I. Yakerson, V. D. Nissenbaum, E. Z. Golosman, and V. M. Mastikhin, "High Resolution NMR Study of Calcium Aluminate Catalysts," translated from Kinetika I Kataliz, 27 [6] 1419–26(1986).
18. J.-H. Choy, J.-K. Kang, J.-C. Park, N.-B. Chan, and M. Rey-Lafon, "Thermotropic Phase Transitions in the Bidimensional Compound $(C_{10}H_{21}NH_3)_2CUCl_4$," J. Chim. Phys., 90, 1829–54 (1993).

19. J.-H. Choy, J.-K. Kang, J.-W. Uh, A. Weiss, and M. Rey-Lafon, "X-ray Diffraction, Differential Scanning Calorimetry, and Spectroscopic Studies of Phase Transitions in FeOCl-n-Alkylamine Intercalation Complexes," J. Sol. St. Chem., 77, 60–6 (1988).
20. Kriven, W. M., "Displacive Transformations and Their Applications in Structural Ceramics," J. De. Phys. IV, 5, c8-101–c8-110 (1995).
21. J. A. Bland, "The Crystal Structure of Barium Orthotitanate, $Ba_2TiO_4$" Acta. Cryst., 14 875–881 (1961).

What is claimed is:

1. A process for preparing a mixed metal oxide powder, said process comprising:
   forming a liquid solution containing cations of at least two different metal species and a non-chelating polymer containing partially negatively charged functional groups, wherein said solution contains a molar excess of the cations relative to the partially negatively charged functional groups on the polymer;
   removing liquid from said solution to form a solid precursor material having the cations homogeneously distributed therein; and
   calcining said solid precursor material to form a mixed metal oxide powder.

2. The process of claim 1 wherein said polymer is a polyhydroxyl polymer.

3. The process of claim 2 wherein the polyhydroxyl polymer is selected from polyvinyl alcohol polymers and polyalkylene glycol polymers.

4. The process of claim 1 wherein the mixed metal oxide powder is a single phase mixed metal oxide powder.

5. The process of claim 3 wherein the polyalkylene glycol polymer is a poly($C_2$ to $C_5$ alkylene) glycol polymer.

6. The process of claim 5 wherein the polyalkylene glycol polymer is a polypropylene glycol or polyethylene glycol polymer.

7. The process of claim 6 wherein the polyethylene glycol polymer is formed in situ with the cations by polymerization of ethylene glycol.

8. The process of claim 1 wherein said calcining includes heating to a temperature in the range of about 600° C. to about 1200° C.

9. The process of claim 1 wherein the liquid solution contains the cations and the non-chelating polymer in a ratio of positively charged valences from the metal cations to partially negatively charged functional groups on the non-chelating polymer of about 4:1 to about 12:1.

10. The process of claim 1 wherein the weight ratio of said formed mixed metal oxide powder to said non-chelating polymer is about 0.2:1 to about 1:1.

11. The process of claim 1 wherein the weight ratio of said formed mixed metal oxide powder to the non-chelating polymer is about 0.25:1 to about 0.75:1.

12. The process of claim 1 wherein one of the at least two metals is aluminum.

13. The process of claim 1 wherein said forming comprises heating the solution to facilitate dissolution of the non-chelating polymer.

14. A process for preparing a mixed metal oxide powder, said process comprising:
   forming a homogeneous liquid solution containing cations of at least two different metal species and a non-chelating polymer wherein the non-chelating polymer is formed in situ with the cations;
   removing liquid from said mixture to form a solid precursor material having the cations homogeneously distributed therein; and
   calcining said solid precursor material to form a mixed metal oxide powder.

15. The process of claim 14 wherein said polymer is a polyhydroxyl polymer.

16. The process of claim 14 which includes comminution of said mixed metal oxide powder to produce a powder having an average particle diameter of less than about 10 micrometers.

17. The process of claim 14 wherein one of the at least two metals is aluminum.

18. A process for preparing a powder of a metal oxide containing at least two different metal species in a specified stoichiometric ratio, said process comprising:
   providing a solution comprising a solvent, cations of said at least two metals metal species dissolved in the solvent in said stoichiometric ratio, and a carrier polymer dissolved in the solvent said carrier polymer having partially negatively charged functional groups, wherein the molar ratio of cationic valences of the cations of the at least two metals to the partially negatively charged functional groups of the carrier polymer is about 4:1 to about 12:1;
   removing the solvent from said solution to form an organometallic precursor gel having the cations homogeneously distributed therein; and
   calcining said organometallic precursor gel to form the powder.

19. The process of claim 18 wherein said providing a solution comprises heating the solution to facilitate dissolution of the non-chelating polymer.

20. A process for preparing a metal oxide powder, said process comprising:
   dissolving a non-chelating polymer having negatively charged function groups and a molar excess of cations of at least two metals relative to the negatively charged functional groups of the polymer in a solvent to form a liquid precursor;
   forming a solid organometallic precursor from the liquid precursor having the cations sterically entrapped homogeneously therein by the polymer; and
   calcining said organometallic precursor to form an amorphous metal oxide powder.

21. The process of claim 20 further including heating the amorphous metal oxide powder to form a crystallized mixed metal oxide.

22. The process of claim 20 wherein the non-chelating polymer is selected to have a degree of polymerization sufficient to provide an amorphous metal oxide having a narrow particle size distribution range.

23. A process for preparing a mixed metal oxide powder, said process comprising:
   forming a homogeneous liquid solution containing cations of at least two different metal species and a non-chelating polymer containing partially negatively charged functional groups, wherein said mixture contains a stoichiometric excess of the cations relative to the number of monomer units of the non-chelating polymer;
   removing liquid from said solution to form a solid precursor material having the cations homogeneously distributed therein; and calcining said solid precursor material to form a mixed metal oxide powder.

24. A process for preparing a mixed metal oxide powder, said process comprising:

dissolving cations of at least two different metal species and a non-chelating polymer containing partially negatively charged functional groups in a liquid to provide a clear solution, wherein said solution contains a molar excess of the cations relative to the partially negatively charged functional groups on the polymer;

removing liquid from said mixture to form a solid precursor material having the cations homogeneously distributed therein; and calcining said solid precursor material to form a mixed metal oxide powder.

25. The process of claim 24 wherein said dissolving comprises heating the solvent to facilitate dissolution of the non-chelating polymer.

* * * * *